US007902684B2

(12) United States Patent
Davison et al.

(10) Patent No.: US 7,902,684 B2
(45) Date of Patent: Mar. 8, 2011

(54) WIND AND WATER POWER GENERATION DEVICE USING A TIERED MONORAIL SYSTEM

(75) Inventors: Fred E. Davison, Highwood, MT (US); Gary Davison, Highwood, MT (US)

(73) Assignee: Environmental Energy Systems, Inc., Highwood, MT (US)

( * ) Notice: Subject to any disclaimer, the term of this patent is extended or adjusted under 35 U.S.C. 154(b) by 635 days.

(21) Appl. No.: 11/974,685

(22) Filed: Oct. 15, 2007

(65) Prior Publication Data

US 2008/0157526 A1 Jul. 3, 2008

Related U.S. Application Data

(63) Continuation-in-part of application No. 11/485,181, filed on Jul. 11, 2006, now abandoned, which is a continuation-in-part of application No. 10/467,589, filed as application No. PCT/US01/21553 on Jul. 3, 2001, now Pat. No. 7,075,191.

(60) Provisional application No. 60/215,794, filed on Jul. 5, 2000.

(51) Int. Cl.
*F03D 9/00* (2006.01)
*H02P 9/04* (2006.01)

(52) U.S. Cl. ............................................ 290/44; 290/55

(58) Field of Classification Search .................... 290/43, 290/44, 54, 55; 415/7, 4.2, 2.1, 907; 114/102.16, 114/118; 104/24; 416/132 B; 60/398
See application file for complete search history.

(56) References Cited

U.S. PATENT DOCUMENTS

| 1,923,971 | A | 8/1933 | Evans |
| 3,548,122 | A | 12/1970 | Hay |
| 3,550,535 | A | 12/1970 | Rooklyn |
| 3,730,643 | A | 5/1973 | Davison |
| 3,902,432 | A | 9/1975 | Shortridge et al. |
| 3,916,797 | A | 11/1975 | Block et al. |
| 3,927,330 | A | 12/1975 | Skorupinski |
| 3,950,952 | A | 4/1976 | Krings |
| 4,144,817 | A | 3/1979 | Morita |
| 4,163,905 | A | 8/1979 | Davison |
| 4,170,738 | A | 10/1979 | Smith |
| 4,589,344 | A | 5/1986 | Davison |
| 4,832,569 | A | 5/1989 | Samuelsen et al. |
| 4,859,146 | A | 8/1989 | Labrador |
| 5,313,103 | A | 5/1994 | Hickey |

(Continued)

OTHER PUBLICATIONS

Powe et al., "Development of a large capacity wind powered electrical generating system: A concept," research Report, Mechanical engineering Dept. Montana State University, Sep. 1, 1973.

(Continued)

*Primary Examiner* — Julio Gonzalez
(74) *Attorney, Agent, or Firm* — Thorpe North & Western LLP

(57) ABSTRACT

A power generation assembly for use in generating electrical power from air or water currents includes a tiered rail system forming elongated loops, a vane assembly having a frame and at least one vain, and car assemblies sidably mounted to each rail, including linkage portions coupled to the frame of the vane assembly and a power-take-off arrangement includes an element that is operatively coupled to the car assembly and a drive wheel coupled to a generator and configured to take power off the moving car assembly by the drive wheels being rotated by the passing power-take-off element or a power-take-off system using a cable and clamps.

29 Claims, 23 Drawing Sheets

U.S. PATENT DOCUMENTS

| | | |
|---|---|---|
| 5,350,273 A | 9/1994 | Hector et al. |
| 5,386,146 A | 1/1995 | Hickey |
| 5,758,911 A | 6/1998 | Gerhardt |
| 5,992,341 A | 11/1999 | Gerhardt |
| 6,629,815 B2 | 10/2003 | Lusk |
| 6,672,522 B2 | 1/2004 | Lee et al. |
| 7,075,191 B2 | 7/2006 | Davison |
| 7,276,810 B2 * | 10/2007 | Mohring .................. 290/55 |
| 2004/0164562 A1 | 8/2004 | Latyshev |
| 2004/0168604 A1 | 9/2004 | Zorn et al. |
| 2006/0131890 A1 * | 6/2006 | Gizara .................. 290/43 |
| 2008/0042444 A1 * | 2/2008 | Johnson .................. 290/54 |

OTHER PUBLICATIONS

Madaras, Julius D., "Big electric plant run by wind," Popular Science Monthly, Jan. 1932.

Gogins, Laird B., "Biggest wind machine: 200-ft Turbine Blades Mounted on Rail Cars": News Trend.

"Integrated Wind-Hydroelectric Generation—Integration of wind and hydroelectric power", Montana Rural Electric News.

McCawley, James, "Dynaship," Sea Frontiers Magazine, Jan.-Feb. 1973.

"A Catamaran with Venetian Blinds"—Popular Science, Nov. 1974, p. 80.

* cited by examiner

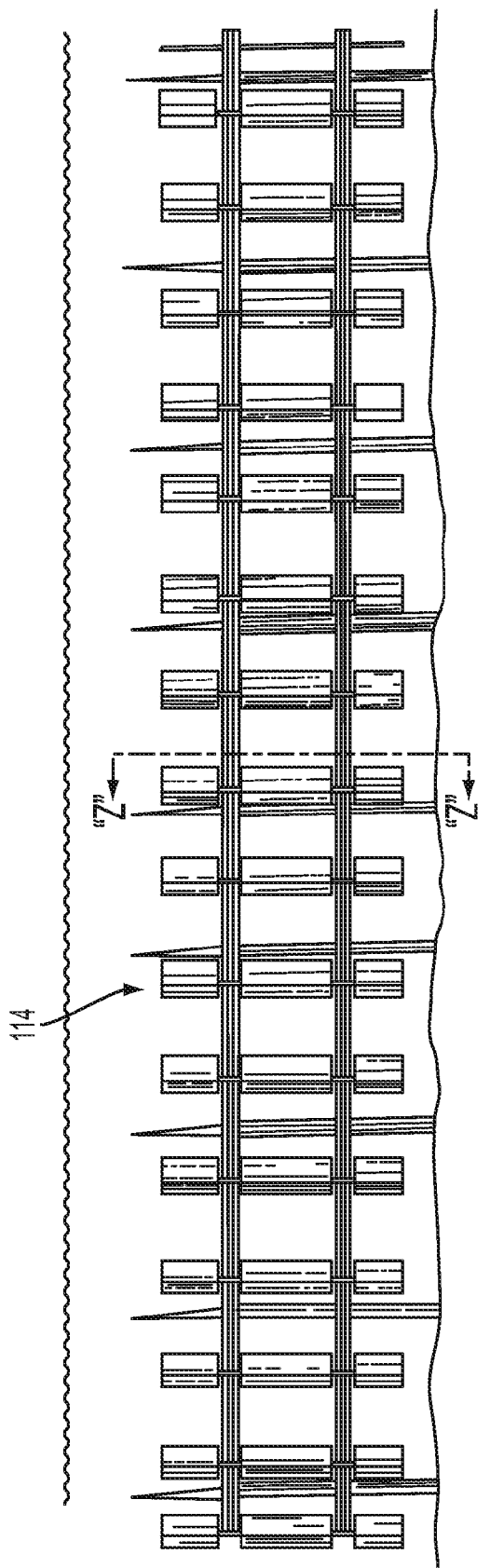
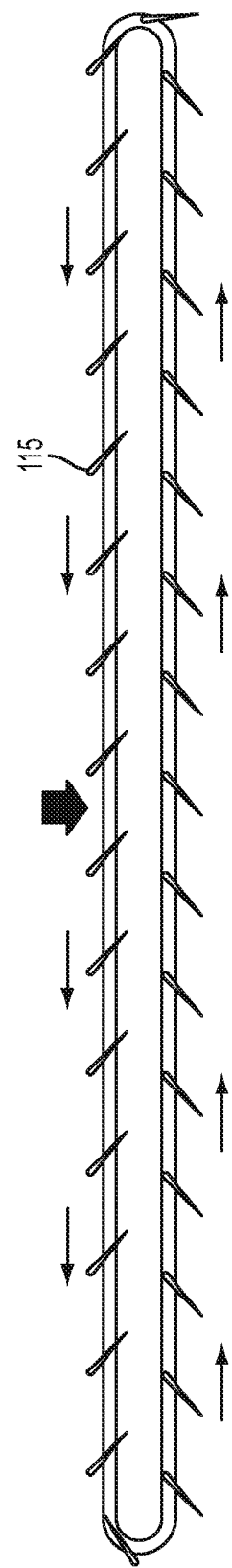
FIG. 4
FIG. 5

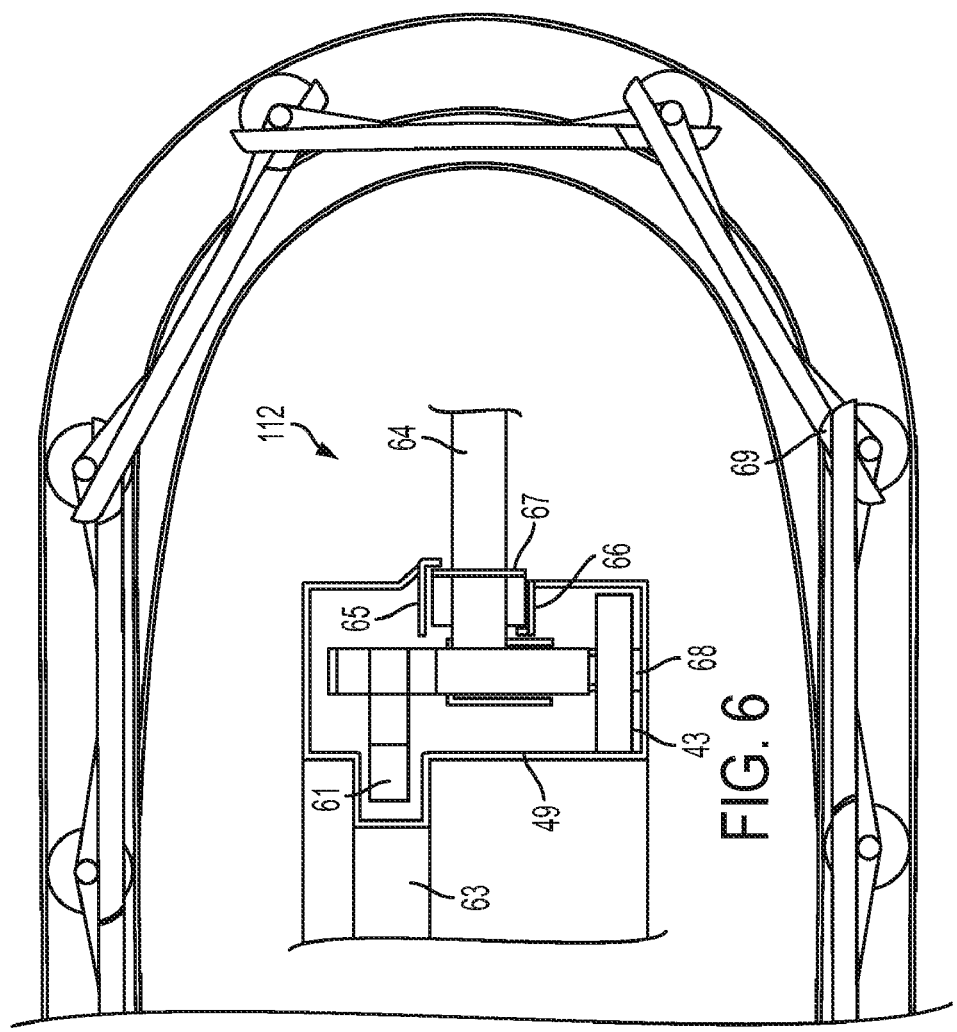
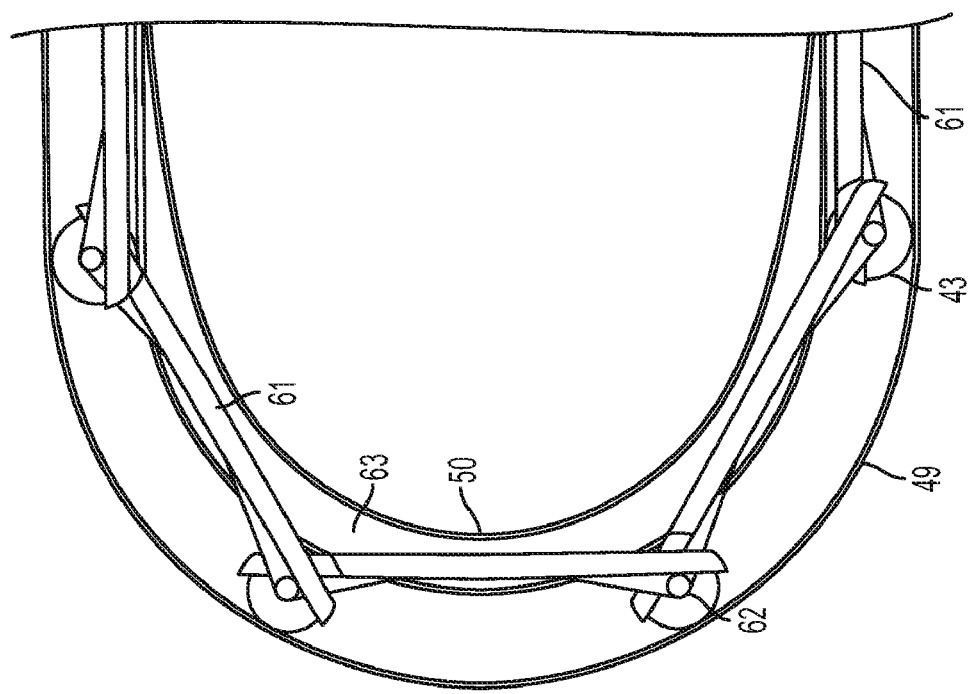
FIG. 6
FIG. 7

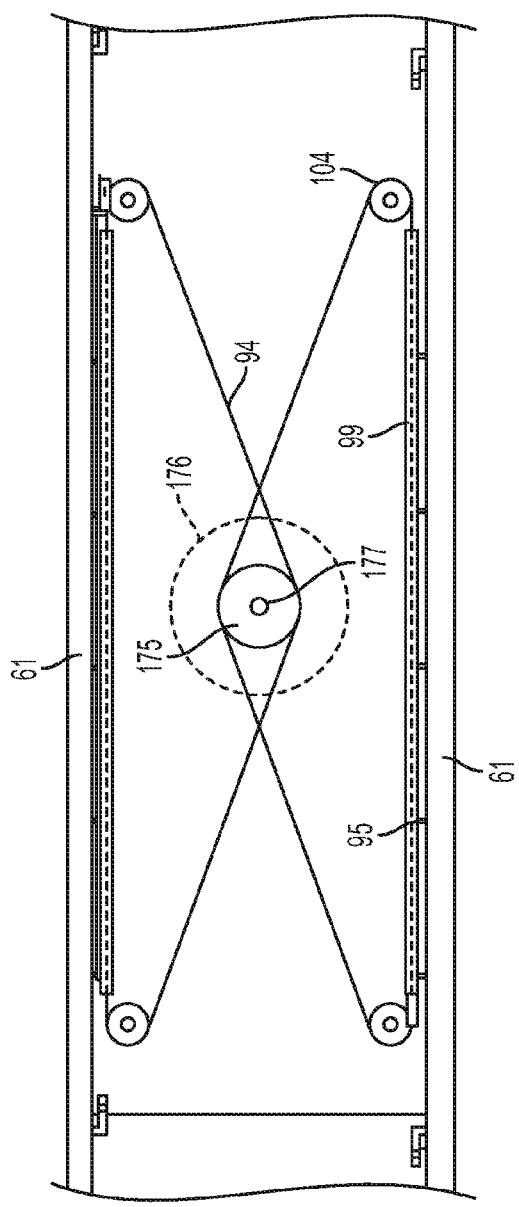
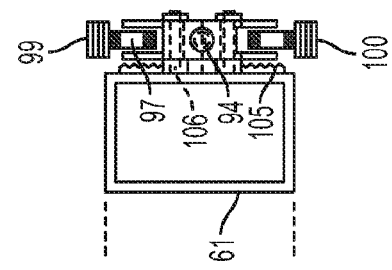
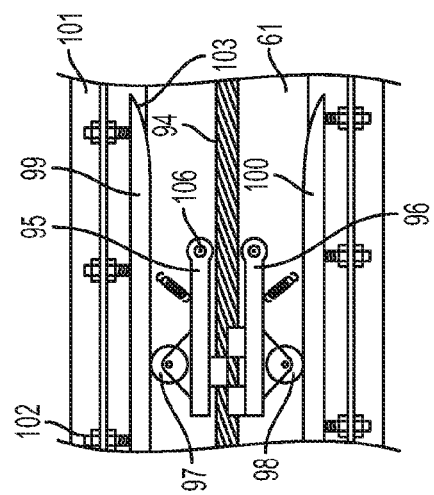
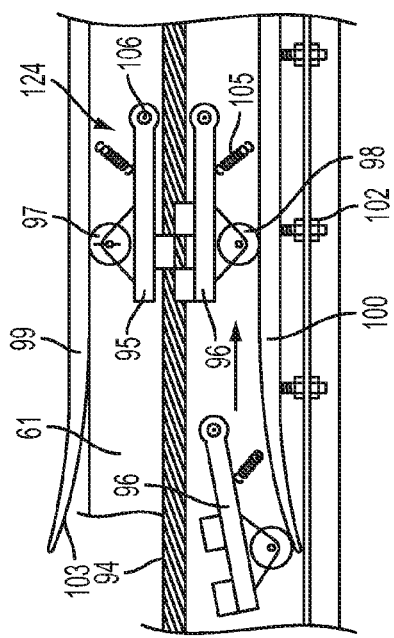
FIG. 12A
FIG. 12D
FIG. 12C
FIG. 12B

CUT "M-M"

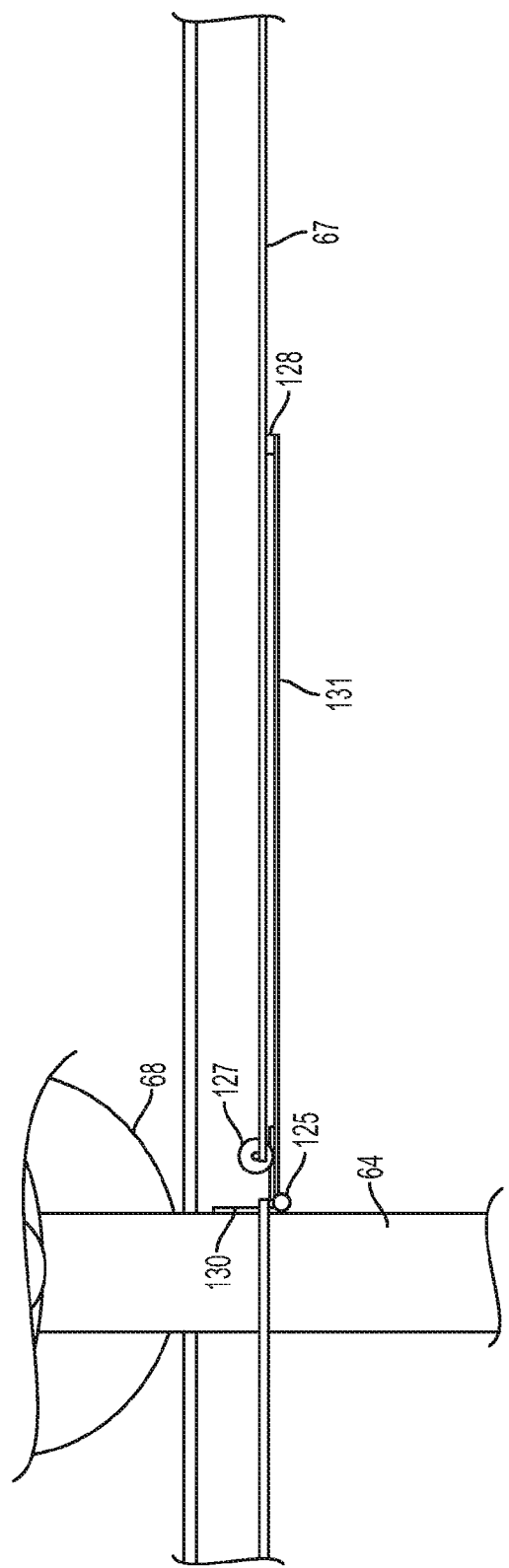
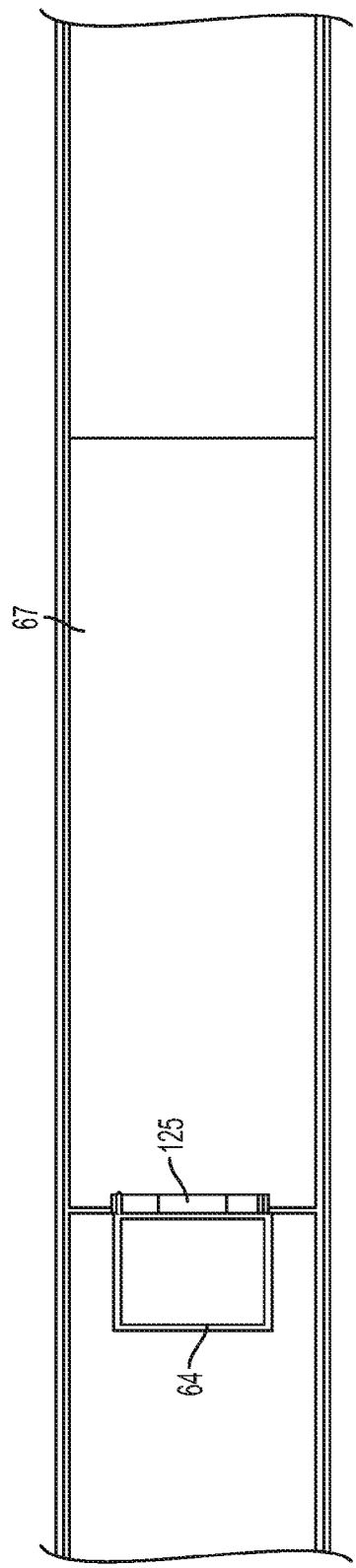
FIG. 15A
FIG. 15B

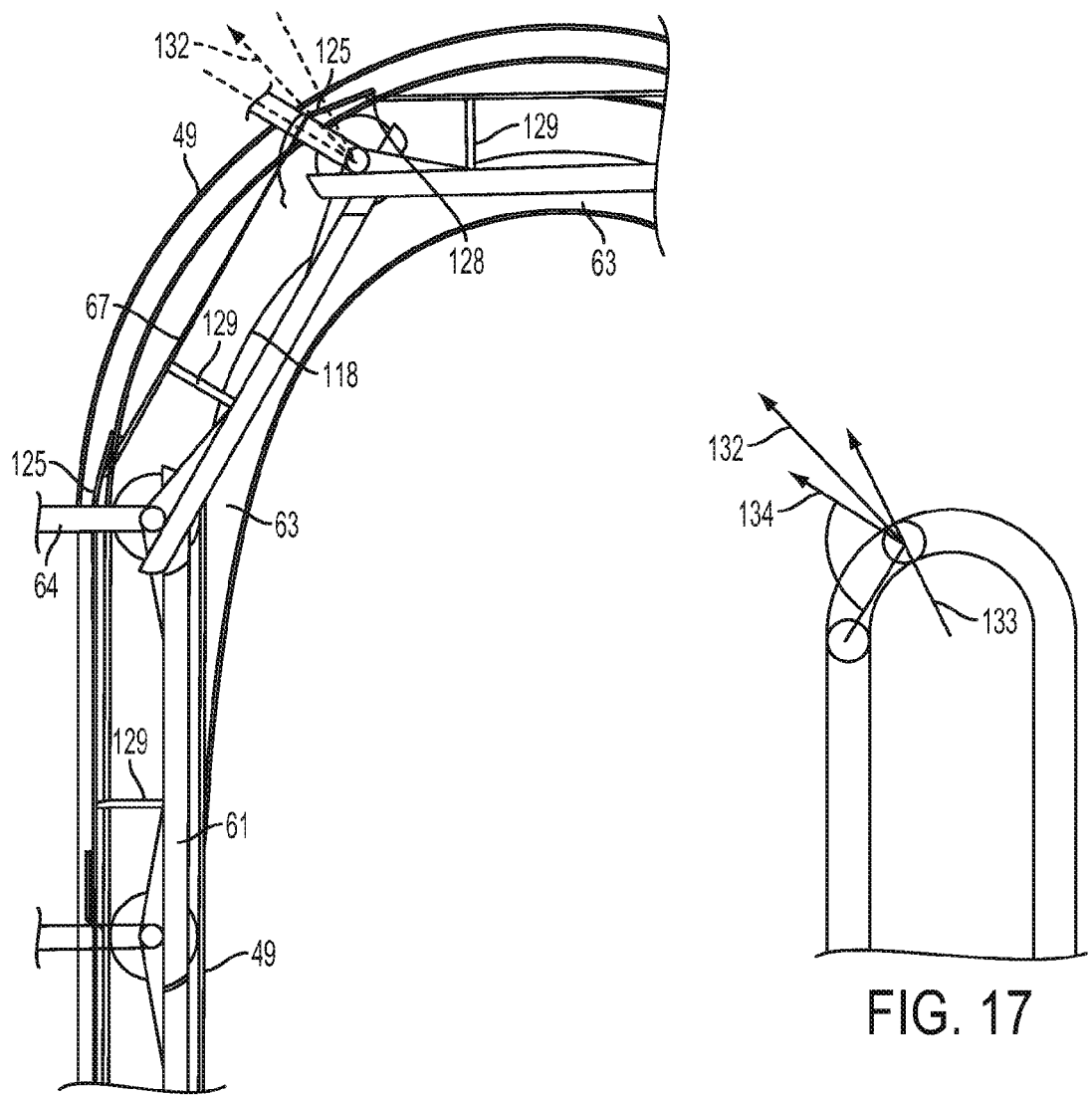
FIG. 16
FIG. 17
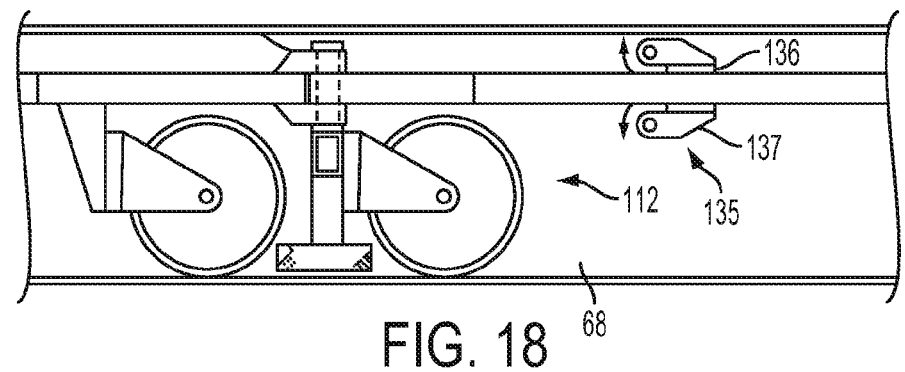
FIG. 18 ated substantial quantities of electricity. The apparatus includes a plurality of sail-driven cars connected to form a continuous chain and suspended from a monorail loop. The car suspension system has two horizontal guide wheels and one vertical carrier wheel. Substantially, the entire weight of each car is carried by its vertical wheel, which is located near the car's center of gravity. Further, all three suspension wheels are located inside the monorail, thereby rendering car derailment virtually impossible. Two sails are attached to each car, one being directed upwardly and the other being directed downwardly. The surface areas of the two sails are such that the average, total current force of each sail is approximately the same. Additionally, the novel sails are free to rotate 360 degrees about their support poles, but they are biased to a preferred orientation. Thus, as the current and biasing forces interact, the cars are propelled along the monorail. Importantly, in the event that destructive strength currents arise, the sails rapidly align themselves with the current, thereby preventing sail destruction. One or more elongated augers are positioned adjacent the monorail loop. Auger drive rollers are attached to each car such that the adjacently moving cars rotate the auger. A generator is connected to the augers so as to be driven thereby.
WIND AND WATER POWER GENERATION DEVICE USING A TIERED MONORAIL SYSTEM

CROSS-REFERENCE TO RELATED APPLICATIONS AND CLAIM OF PRIORITY

This is a continuation-in-part application of U.S. patent application Ser. No. 11/485,181, filed Jul. 11, 2006 now abandoned; which is a continuation-in-part application of U.S. patent application Ser. No. 10/467,589, filed Aug. 7, 2003, now issued as U.S. Pat. No. 7,075,191; which is a 371 of PCT/US01/21553, filed Jul. 3, 2001; which claims priority of U.S. Provisional Patent Application No. 60/215,794, filed Jul. 5, 2000, each of which are hereby incorporated herein by reference in their entirety.

THE FIELD OF THE INVENTION

The present invention relates to a power generation assembly for use in generating electrical power from air or water currents, and more particularly to a dual monorail based conveyance system having low-mass car assemblies.

BACKGROUND OF THE INVENTION

In the last several decades wind power has grown to be a worldwide phenomenon with spectacular growth in the U.S. Recently, the Department of Energy has called for the development of larger and taller single unit wind machines to capture better wind resource at greater height. The DOE is encouraging the development of systems that will be more efficient in areas with somewhat lower wind speeds, particularly throughout the mid-western states where the resource is considered to be vast, and much development is expected.

With the growing concerns about human caused global warming and instabilities in fossil fuel producing regions of the world, a growing number of people are voicing interest in the development of more wind power and other renewable energy systems.

Examples of systems adapted for harnessing the energy of wind and water are disclosed in the following patents, which are hereby incorporated by reference for their supporting teachings:

U.S. Pat. No. 3,730,643 to Davison discloses wind power machine in which a plurality of sails connected to an endless chain move about an endless horizontal track to drive an electric generator. Each sail is mounted on an individual truck supported on the track. The endless track is arranged as two spaced apart parallel runs connected by semi-circular end sections. Each sail is rotatable about a vertical pivot on its truck and is controllable so that the sails can be positioned to drive the machine while moving along one run of the track and to be positioned to offer the least wind resistance while moving in the reverse direction along the other run of the track. Depending upon the direction of the wind the sails in most instanced can be adjusted to provide drive along both runs of the track. The sails are adjusted by and electric motor drive controlled by a wind vane. In a modified control system an anemometer is provided to over ride the wind vane control to align the sails with the wind to present the least resistance to the wind when the wind power machine is subjected to winds of damaging force.

U.S. Pat. No. 4,163,905 to Davison discloses a submerged water power machine in which a plurality of vertical blades are connected to two endless chains, one located at the top ends and the other located at the bottom ends of the blades. The blades drive the chains about two endless horizontal tracks, and the chains are drivingly coupled to electric generators. Each blade is mounted on an individual truck supported on the top track and is guided at its bottom by a roller within the bottom track. The endless tracks are arranged as two spaced-apart parallel runs connected by semi-circular end sections. Each blade is adjustable about vertical pivot means on its truck and is controllable so that the blades can be positioned to drive the machine while moving along both runs of the tracks. The blades are adjusted either by electric servo motor drive means controlled by a position programmer or by followers carried by the blades and engaging cam tracks. The trucks, top chain and blade-positioning control elements are contained in pressurized inverted cup-hole housing so that these parts operate in air tether than water. Over this housing is a flotation air compartment containing the generators. Tether lines are employed to anchor the machine to the ocean floor. The blades are spaced for enough apart to allow a portion of the water to flow past the first row of blades into the path of the second row of blades, with the blades of both rows oriented to develop driving force on the chains in the same direction of chain travel.

U.S. Pat. No. 4,589,344 to Davison discloses a novel wind or water powered generator apparatus is provided for gener- U.S. Pat. No. 7,075,191 to Davison discloses a power generation assembly for use in generating electrical power from air or water currents, and more particularly to a rail-based conveyance system having low-mass car assembly. It has a rail system. Slidably mounted on the rail is a car assembly. The car assembly includes a linkage portion that couples the car to vane assembly. The vane assembly includes a frame, to which the linkage portion id connected. A power-take-off device engages generator drive wheels, which are coupled to a generator, thereby driving the generator.

While the foregoing prior art references demonstrate improvement in the field of power generation, each of these prior art references have proven inadequate in several respects. First, a system with a single monorail loop would require the monorail to withstand and resist tremendous cantilevering forces. Irregular wind resource acting upon either a large upper or lower vane would demand that the single monorail be constructed with very heavy materials and the monorail would be susceptible to considerable fatigue. This factor limits the size and overall height potential of the system and would reduce economies of scale.

Additional concerns related to the car assembly are the horizontal play allowed in the monorail at the guide wheels. Through there is bias in the design, a shift and wobble would act on the guide wheels as they rounded the semi-circle ends and the guide wheels would skid and reverse rotation for travel on the leeward side of the system. For obvious reasons, this action would cause irregular ware on the guide wheels and the guide wheel's tracking area within the monorail.

Another concern is that the various working parts of the system are vulnerable to the environment. The longevity and efficiencies of the equipment must be protected.

Accordingly, it would be advantageous to have a power generation system that is modified to allow for more stability to efficiently reach greater height of wind resource.

SUMMARY OF THE INVENTION

There is, therefore, provided a power generation assembly for use in generating electrical power from air or water currents, and more particularly to a multiple rail-based car assembly.

There are at least two rails, one rail, and another rail positioned directly above the first rail. The assembly includes the following features. First, a dual rail system is provided. Slidably mounted on each rail is a car assembly. The car assembly includes a linkage portion that couples the car to a vane assembly. The vane assembly includes a frame, to which the linkage portion is connected, and at least one vain. A power-take-off device is pivotally coupled to the car. The power-take-off devise engages generator drive wheels, which are coupled to a generator, thereby driving the generator.

In one embodiment, the power-take-off device is coupled to the linkage portion of the car. A cable grip clamp is acted upon as it passes through a compression chute at a generating station and is released from gripping cable as the cable grip clamp leaves the generating station. The cable is in a configuration of a continuous loop and passes around a pulley attached to a generator.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

FIG. 4 is a front view of a submerged water power generation system.

FIG. 5 is a diagram showing water blade settings in relation to current flow.

FIG. 6 is a cut side view of a vane car showing a power-take-off device as it traverses an end curve expansion slot.

FIG. 7 is a top view of the interior of the linked cars traversing an expanded oval loop monorail.

FIG. 12(a)-(d) is various cable power-take-off views and configurations according to the present invention.

FIGS. 15(a) and (b) are a sectional top and side view, respectively, of a monorail enclosure assembly.

FIG. 16 is a sectional top view of a curved section of a monorail hinged enclosure.

FIG. 17 is a diagram of a selective angle for a linkage portion coupled to a car assembly.

FIG. 18 is a sectional view of a car with tandem carrier wheels and a break assembly on a power-take-off device.

DETAILED DESCRIPTION OF THE PREFERRED EMBODIMENT(S)

The presently preferred embodiments of the invention will be best understood by reference to the drawings, wherein like parts are designated with like numerals throughout.

Figure 1:
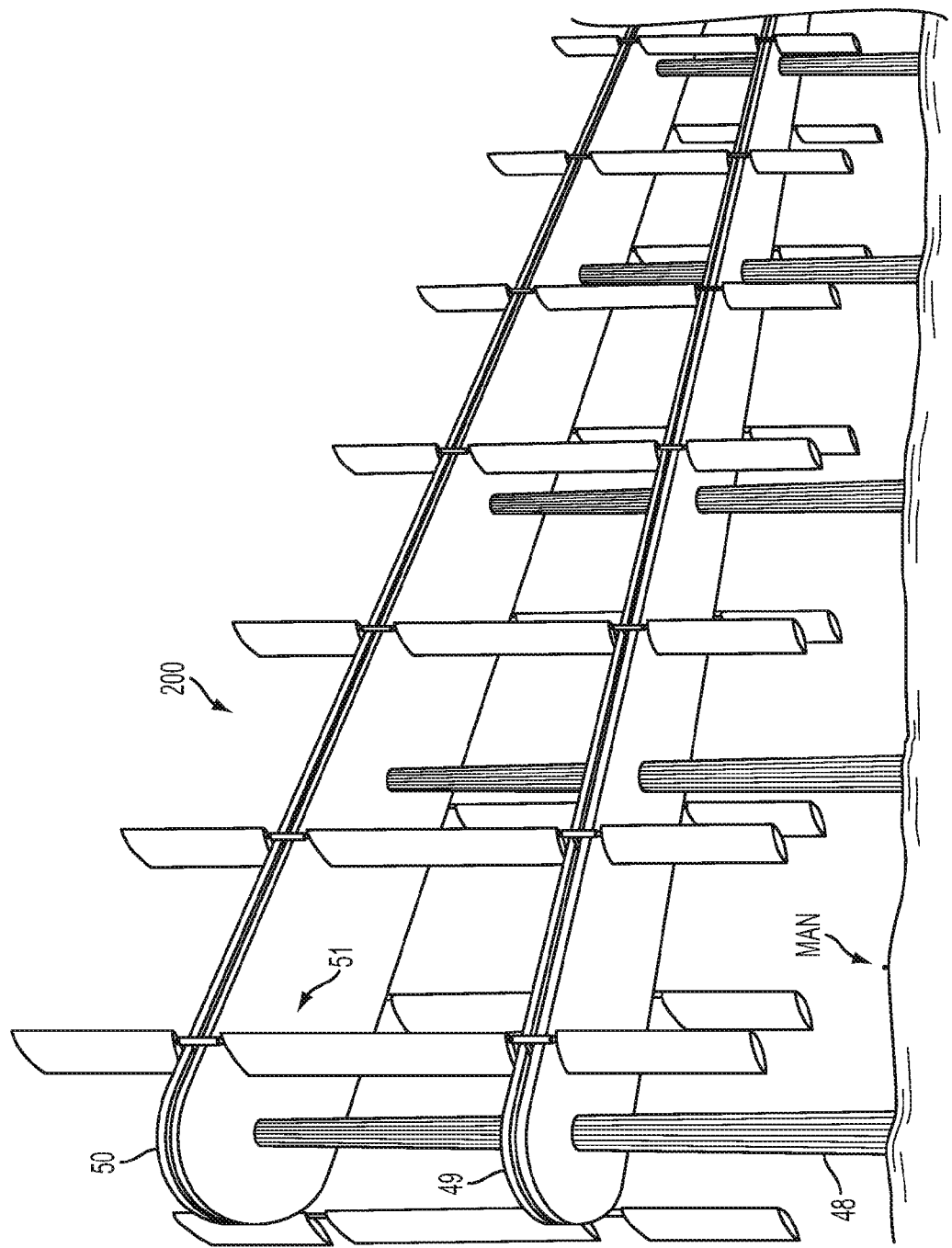
FIG. 1 is a perspective of a power generation assembly according to the present invention.

In FIG. 1 a power generation system 200 is shown. The power generation assembly includes a lower monorail 49 and an upper monorail 50 supported by a common pole support 48. Numerous vane assemblies 51 are shown. However, it is noted that the actual number of vane assemblies 51 used in each power generation assembly 49 and 50 may vary depending of need.

The vane assembly 51 consists of a frame 110 and at least one gang of vanes 52 and 54 positioned on the frame 110.

Figure 2:
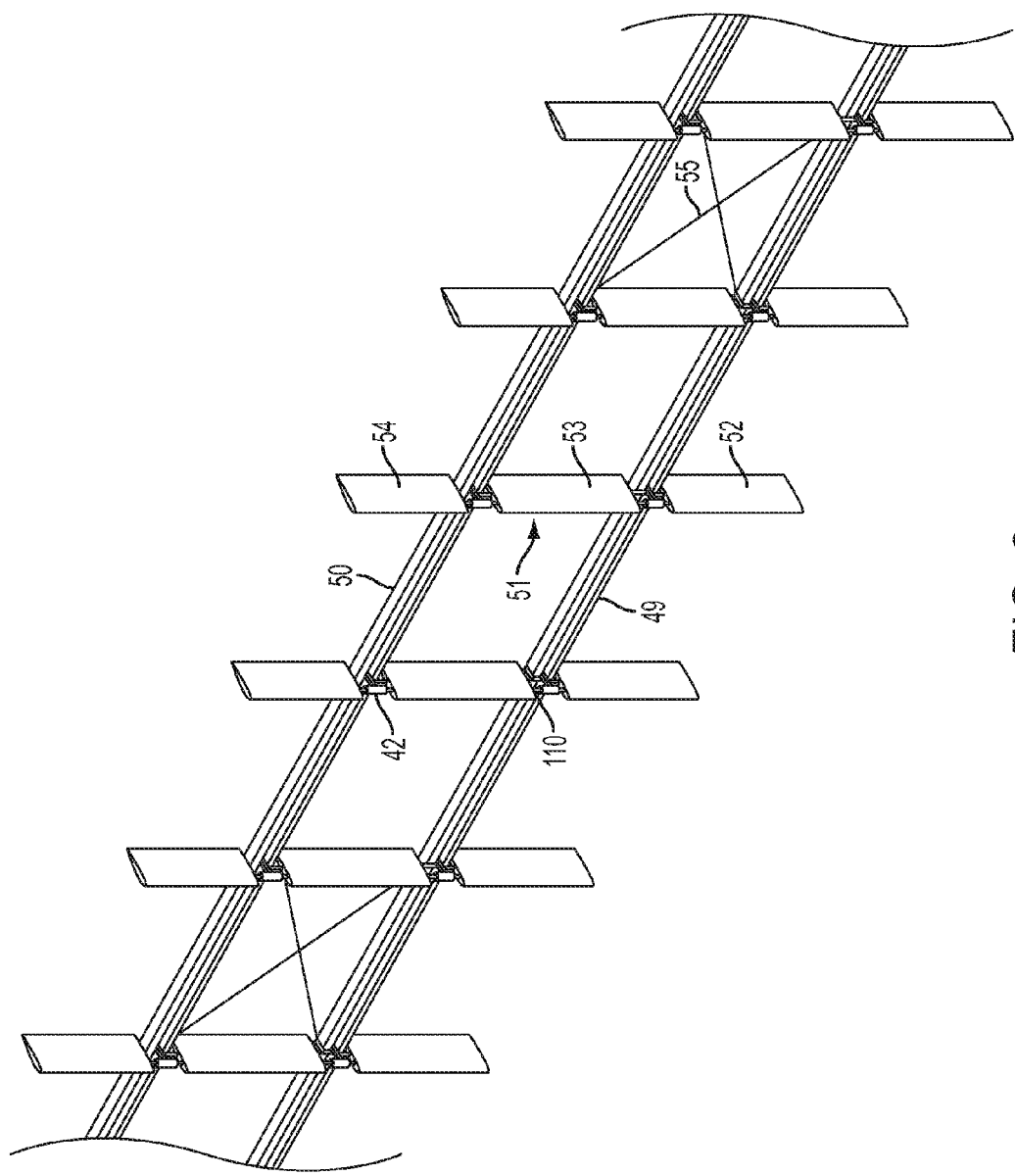
FIG. 2 is a sectional view of a dual monorail configuration, one monorail positioned directly above another monorail, conjoined to airfoil cars with diagonally braced cables.

FIG. 2 shows sails 52, 53, and 54 that are coupled to a common frame which is pivotal in sleeve bearings 42 and are supported by a linkage portion 64. The linkage portion connects to car assembly 112 within monorail 49,50. Each sail assembly 51 is supported by guy cables to keep upper and lower car assemblies that share a common frame, aligned within each monorail.

Figure 3B:
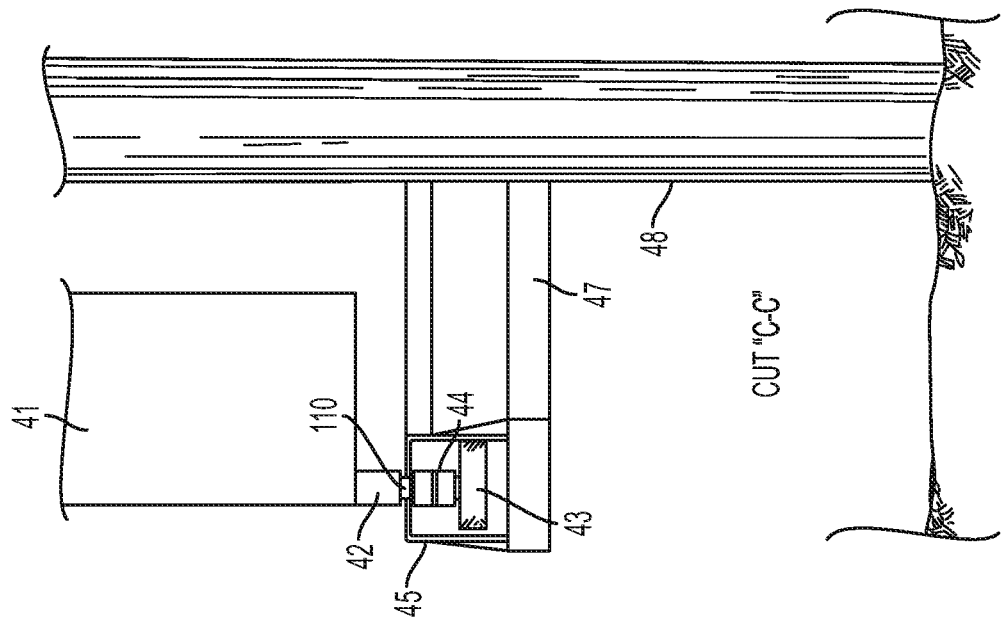
FIG. 3(a) and (b) are a front and side cut view of a lower monorail support.
Figure 3A:
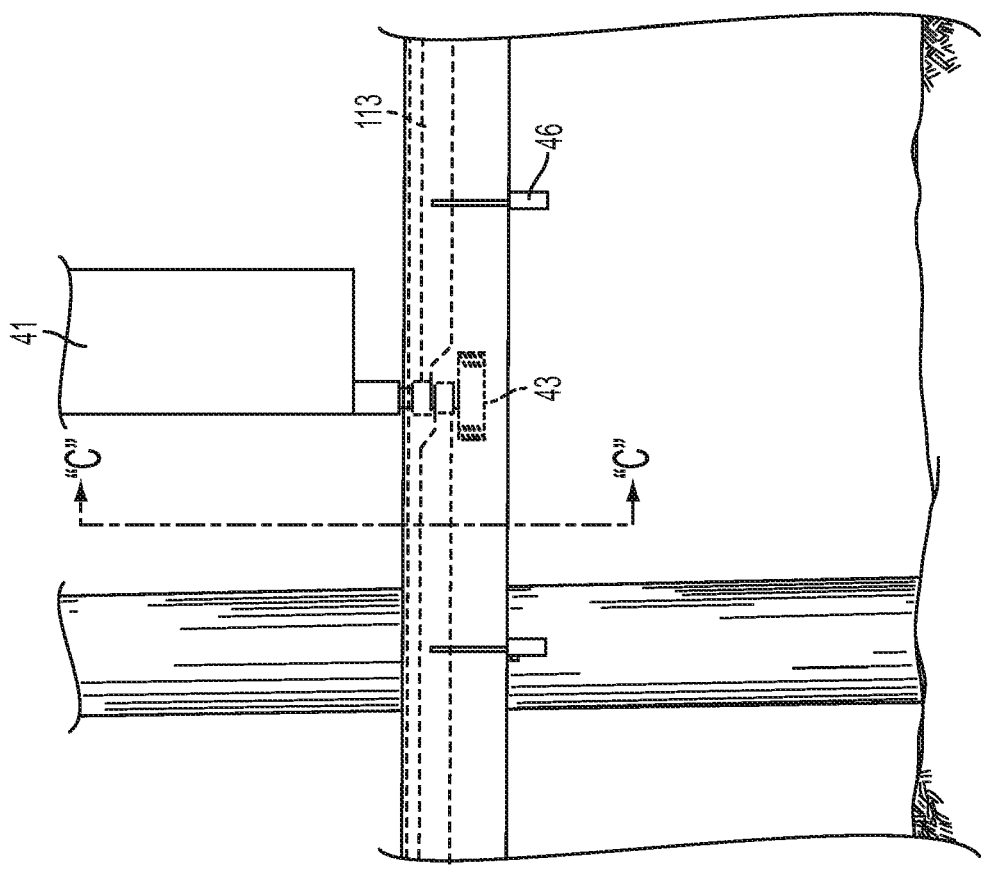
Figure 8A:
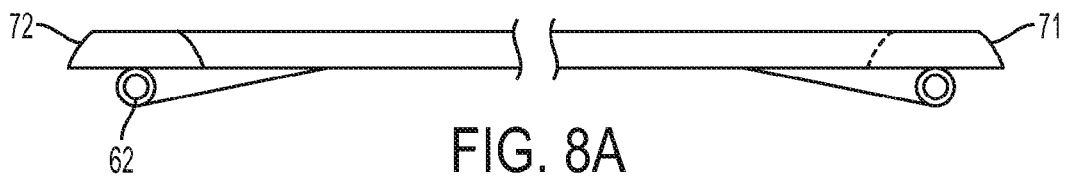
FIG. 8(a)-(e) are various hinged power-take-off assemblies configured according to the present invention.
Figure 8B:
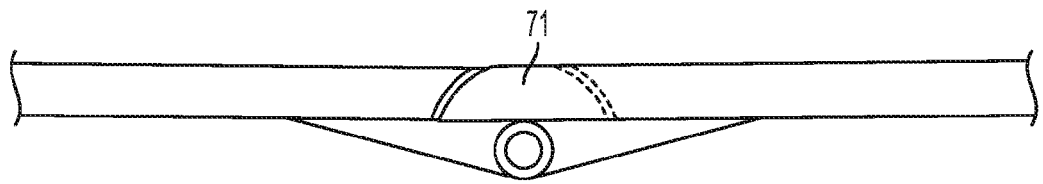
Figure 8C:
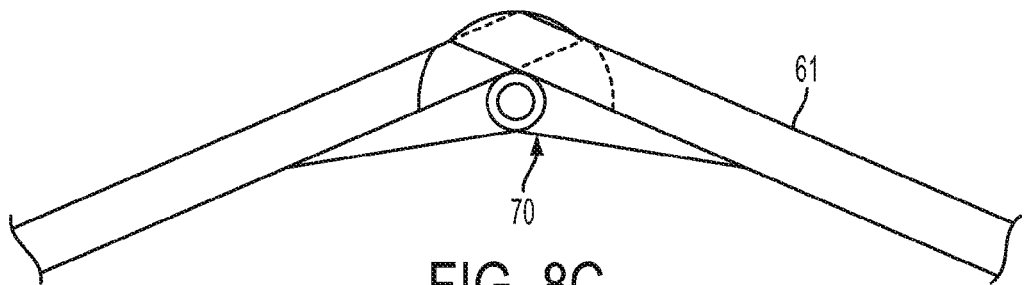
Figure 8D:
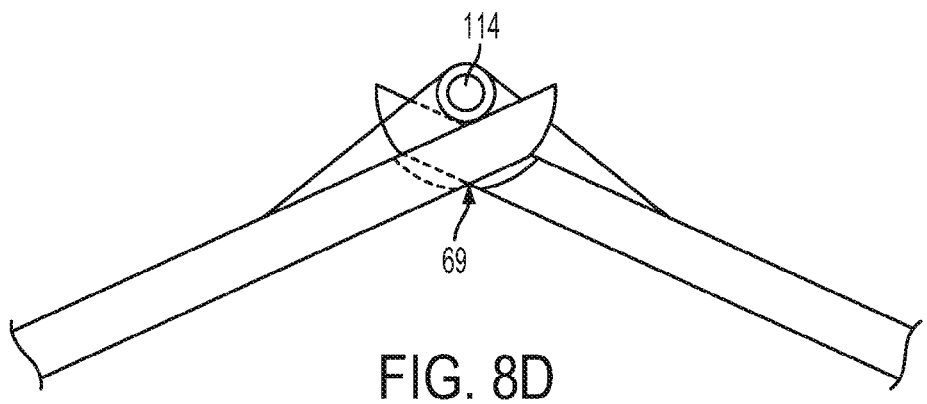
Figure 8E:
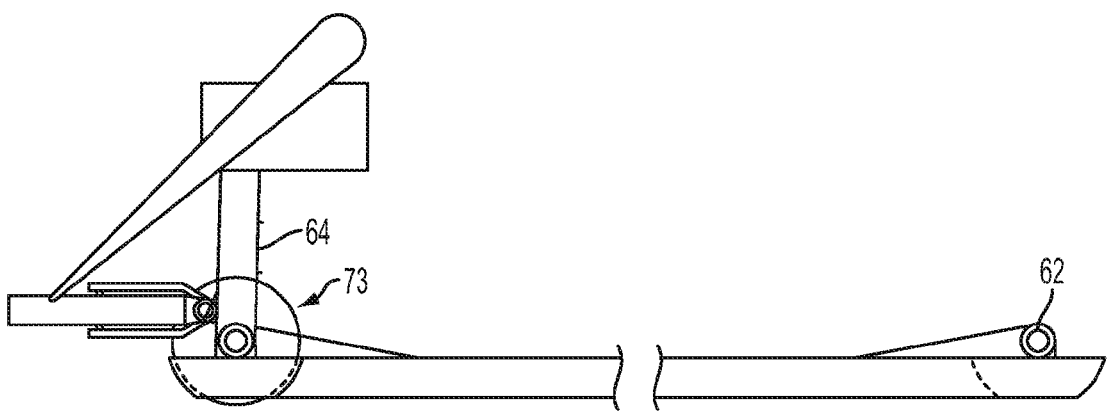

FIG. 3 shows a lower rail 45 supported by an arm 47 from pole 48 and shows a supporting side thrust brace 46. Airfoil 41 has a lower guide wheel 43 only, and is linked by a connector beam 113 with bearings 44 at each end. Guide wheel 43 runs on shaft 110 through bearings 44. This arrangement stabilizes the cantilevering affect allowed by the use of only one monorail with vanes deployed upwardly and downwardly and minimizes structural mass of upper monorail and main car assembly 112.

FIG. 4 shows a submerged version of a power generation assembly 114 is shown with pole supports 48 anchored to the ocean floor.

FIG. 5 illustrates water vane's positions in relation to the water flow. It is noted that all blades pull except for at a very small arc around each end.

FIG. 6 is a sectional view of car assembly 112, showing a power-take-off7device as it would appear in slot 63. When the power-take-off link 61 negotiates the end turns, the link 61 crowds toward guide rail 50 and notch 63 allows the power-take-off link to pass through.

Figure 23A:
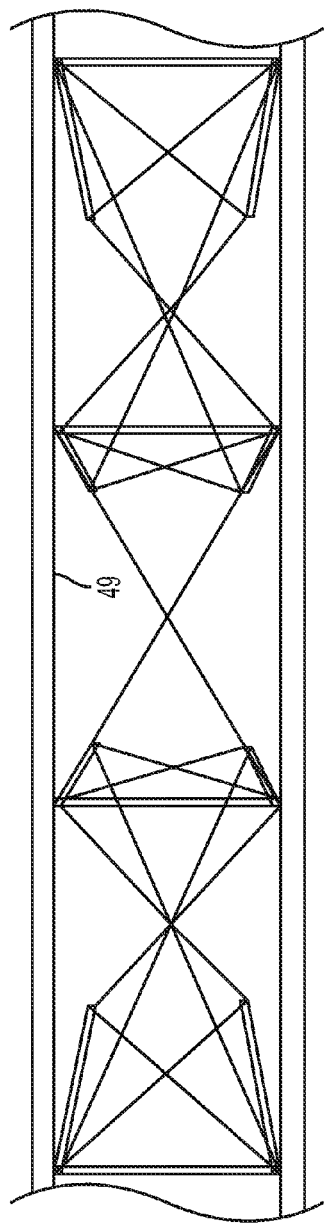
FIGS. 23(a) and (b) are a top perspective and front views of a monorail pole and cable structure.

In FIGS. 7 and 8, several power-take-off 61 connections are illustrated FIG. 7. A bearing 62 rotates around shaft 114 and bends inwardly as shown in FIG. 8(c), or bends outwardly as shown in 8(d). The configuration shown in 8(c), enables the linkage portion 64 and sail assembly 51 to be deployed inside the monorail oval loop track 115 and enables the linkage portion to be deployed outside of the monorail oval loop. Having the ability to deploy airfoil assemblies 51 inside the loop 115 allows a means of support as cables may be attached to the monorail structure from the outside which would allow support at a much greater height. When airfoils are deployed to the out side of loop 155, cable guyed support would be limited to the inside of the loop 115, as illustrated in FIG. 23(a) and FIG. 1. FIG. 8(b) shows a power takeoff section with curved tongue and groove joint ends 71. This allows smooth traversing of the power-take-off device 61 at the joint ends 71 while traversing past the drive wheels 80 and 81.

Figure 10A:
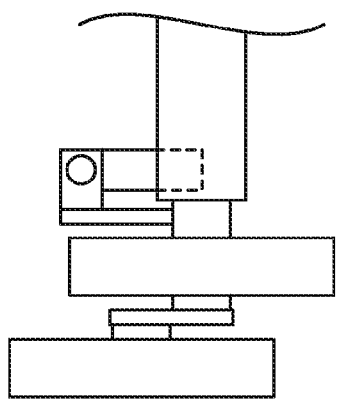
FIG. 10(a) and (b) are front and side sectional views, respectively, of an adjustable guide wheel assembly.
Figure 10B:
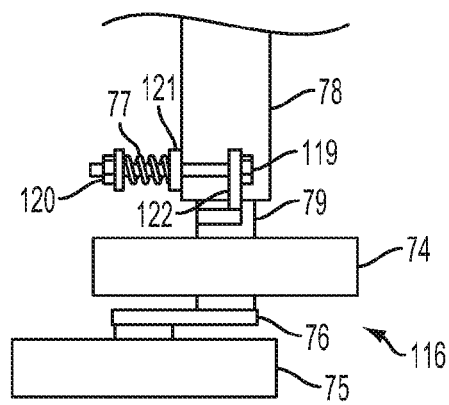

FIGS. 10(a) and (b) shows a: single carrier wheel with an adjustable offset dual guide wheel assembly 116 composing a guide wheel 74 and second guide wheel 75, which are adjustable by and arm 76 from a shaft 74 and is rotated within sleeve bearing 78. A pair of metal straps 121 and 122, where strap 121 attaches securely to a sleeve 78 and the other strap 122 is attached to a shaft 79. Straps 121 and 122 have aligned drilled holes for bolt 119, to traverse through, and is screwed up against spring 77 rotating the shaft arm and guide wheel against inside guide rail 117 and outside guide rail 118 to obtain constant contact with the sides of the rail 117 and 118, eliminating abrupt changes in direction and play on guide wheel 43, as it makes turns and experiences shifts in wind current. This configuration allows guide wheels 74 and 75 to never reverse direction and eliminates any side to side play that is allowed in the rail for guide wheel 43.

Figure 9A:
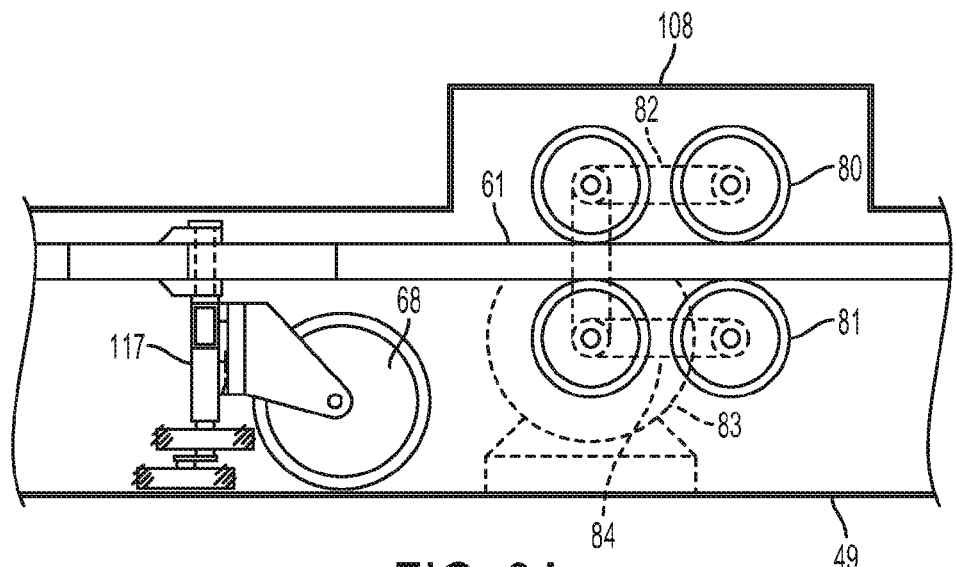
FIG. 9(a) and (b) are front and top sectional views of an airfoil car, power-take-off, and generator assembly.

FIGS. 9(a) and (b) shows a power-take-off device 61 that traverses through traction-wheels 80 and 81, rotating a generator 83. Wheel 80 turns the field one direction, and wheel 81 turns the armature in an opposite direction. This generator 83 has plural rotary elements with an inter-connecting drive mechanism that has been referred to in other literature as a dynamoelectric type generator.

Figure 9B:
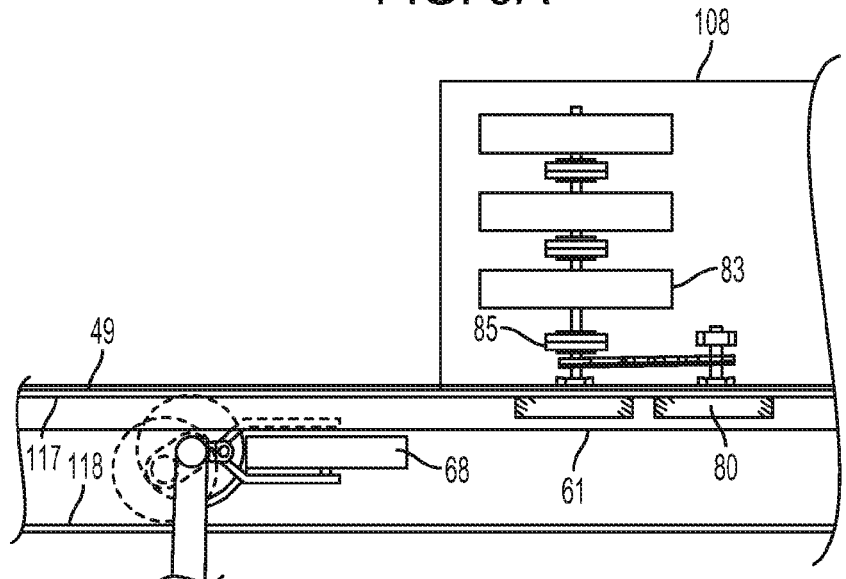

Generators as shown in FIG. 9(b) shows three low revolutions per minute generators 83 with electromagnetic clutches 85. At low velocity wind current, the system begins to move with resistance coming only from the various wheels running freely. Traction wheels 80 and 81 begin to rotate freely. At a determined increase in velocity, the first magnetic clutch 85 engages and the first generator 83 begins to operate. As velocity increases, the next clutch 85 engages the next generator 83 and so on until all generators are fully operational. This power-take-off procedure enables the chain of airfoil cars within the monorail 49 to free-wheel with minimal drag so as to allow start-up without the need for drawing electrical energy from the grid, which is called "powering up" in the Wind Turbine industry.

Figure 11A:
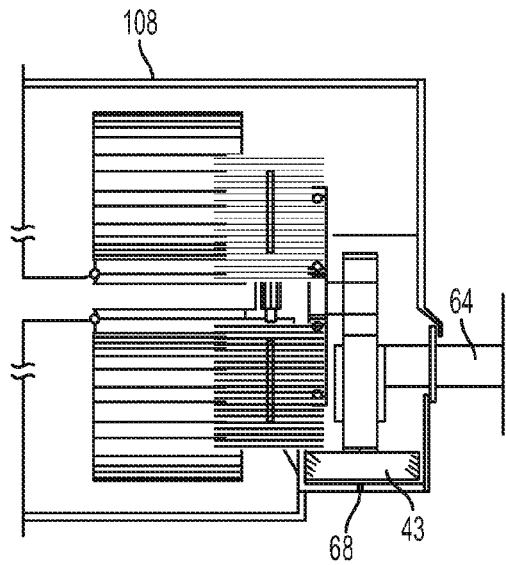
FIG. 11(a)-(c) are two side sectional view of a car and power-take-off, hinged generator, generator assembly engaged and disengaged, and a front sectional view of car, power-take-off, and hinged generator assembly.
Figure 11B:
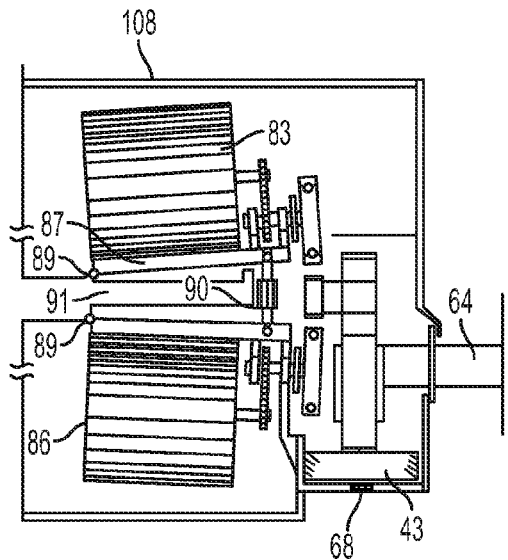
Figure 11C:
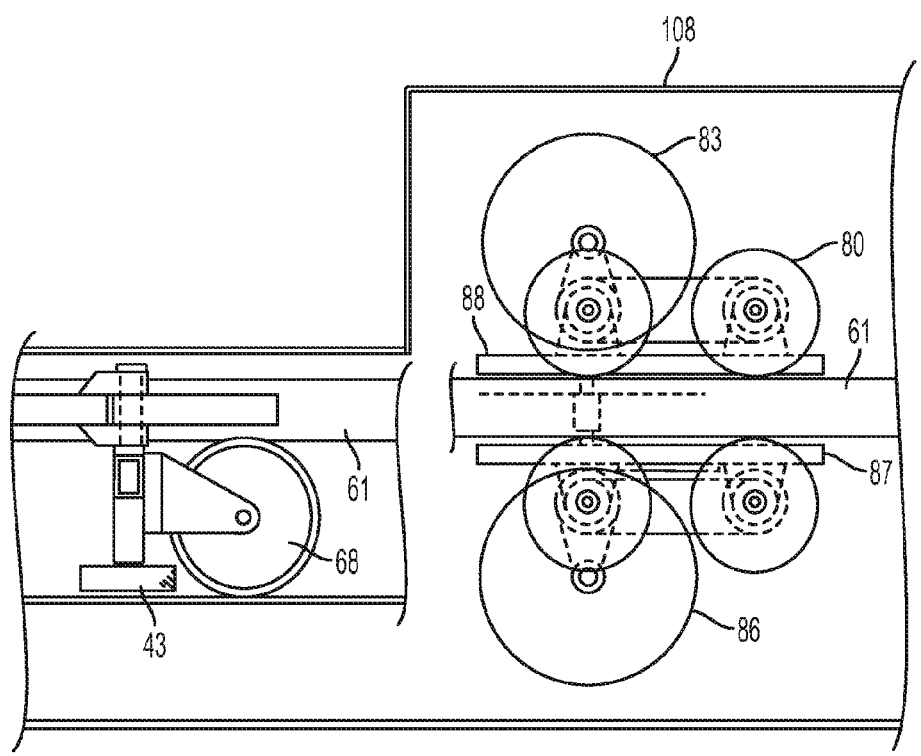

FIG. 11 depicts a generator system of engagement and disengagement of a pair of vertically integrated generators. A power-take-off device 61 traverses through drive wheel gangs 80, turning generators 83 and 86. A hydraulic ram 90 pushes both pairs of generators 83 and 86 away from the power-take-off device 61, pivoting the generators base 91 from hinges 89, releasing the drive system and allowing the monorail car assembly 112 and vane assembly 51 to traverse unimpaired. This configuration allows free-wheeling for start-up procedure and any number of generators positioned around the system to be engaged or not, depending on the need.

FIG. 12(a)-(e) shows another embodiment for a drive system that is similar to gondola movement cable systems used on ski lifts, whereby we reverse the procedure of a powered wheel driving a cable with spring loaded clamps connected to gondolas.

Cable grip clamps 95 and 96 are fastened to, and spaced apart, on the back side of the power-take-off element 61. As these clamps approach a power-take-off station, the rollers 97 and 98 are acted upon by a set of beveled compression rails 99 and 100 which pushes together clamps 95 and 96 by passing through the beveled areas 103, onto the cable 94, driving the cable along side the power-take-off element 61.

Cable clamps 95 and 96 disengage as they exit the beveled end 103 of the compression rail, releasing the grip and enabling springs 105 to pull away the jaws 95 and 96 from the cable. Clamp jaws, in the open position are far enough apart to pass over and under cable pulleys 104. FIG. 12(d) shows a sectional view of a clamped cable.

At least two clamps 124 must be within the compression rails 99 and 100 at one time to provide an uninterrupted driving force on the cable 94. A first cable 94 travels around cable guide pulley 104 and redirects it to a central pulley 175 driving a generator 176 wherein cable 94 raps once and continues to a second cable guide pulley 175 completing a triangular circuit. A second cable 174 drives the generator 83 from the opposite side of the continuous loop that parallels each side of monorail 49 extracting energy from both fore and aft power-take-off trains.

Figure 12E:
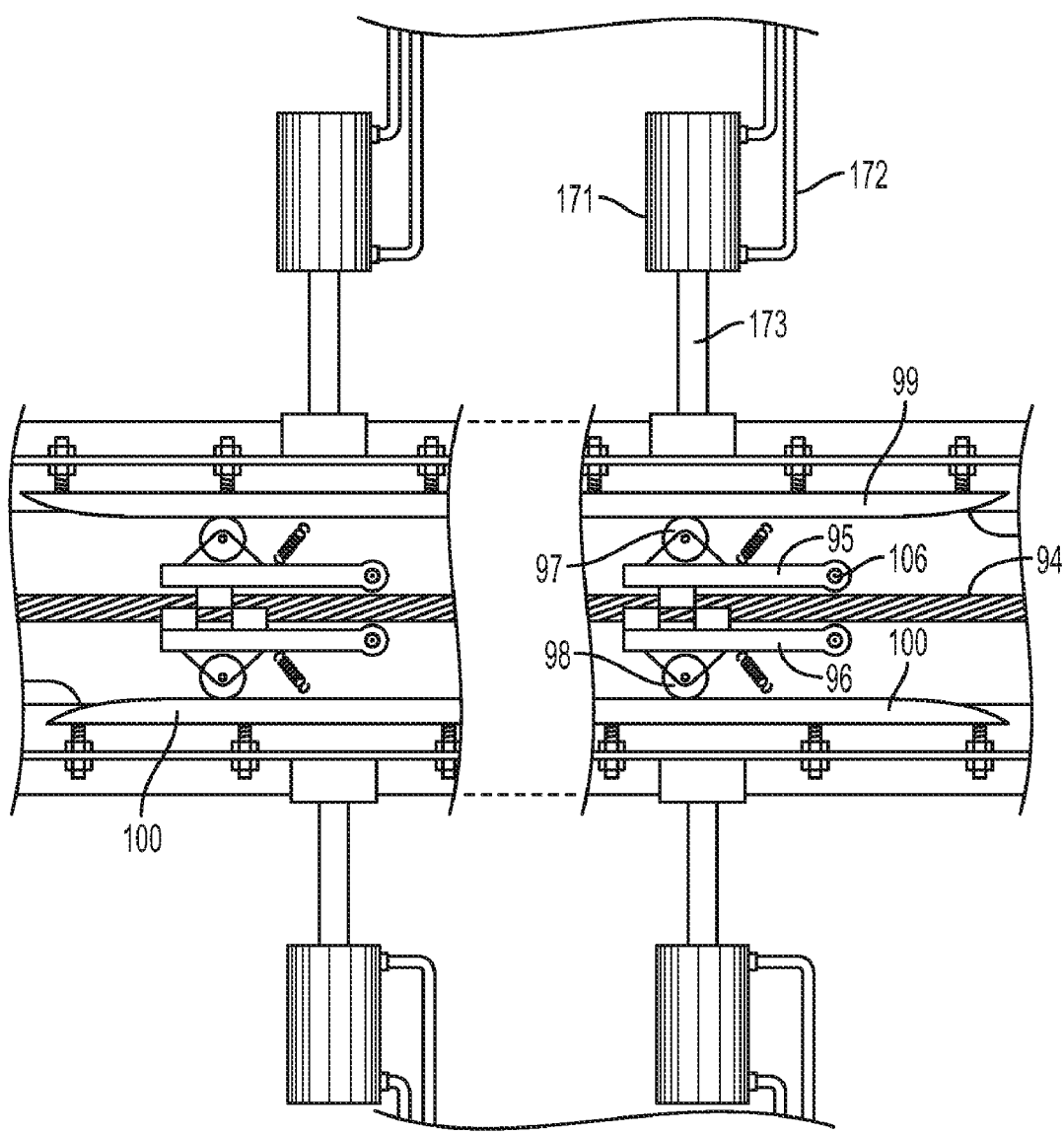
FIG. 12(e) illustrates various hydraulic take-off components in accordance with one embodiment of the invention.

FIG. 12(e) shows hydraulic cylinders 171 with oil lines 172. The cylinder activate plunger shaft 173 to apply a force against beveled compression rails 99 for engagement of clamps 95 and 96 by rollers 97. Reversing oil flow in oil lines 172 the plunger shaft 173 retracts pulling away beveled compression rails 99 and 100 disengaging and opening the chute between rails 99 and 100 allowing the power-take-off element to pass freely.

This allows the generating stations to on be line or not depending on the need according to wind current strength.

The shaft 175 can reach from between monorails to the ground to facilitate a ground based generator 176.

Figure 13:
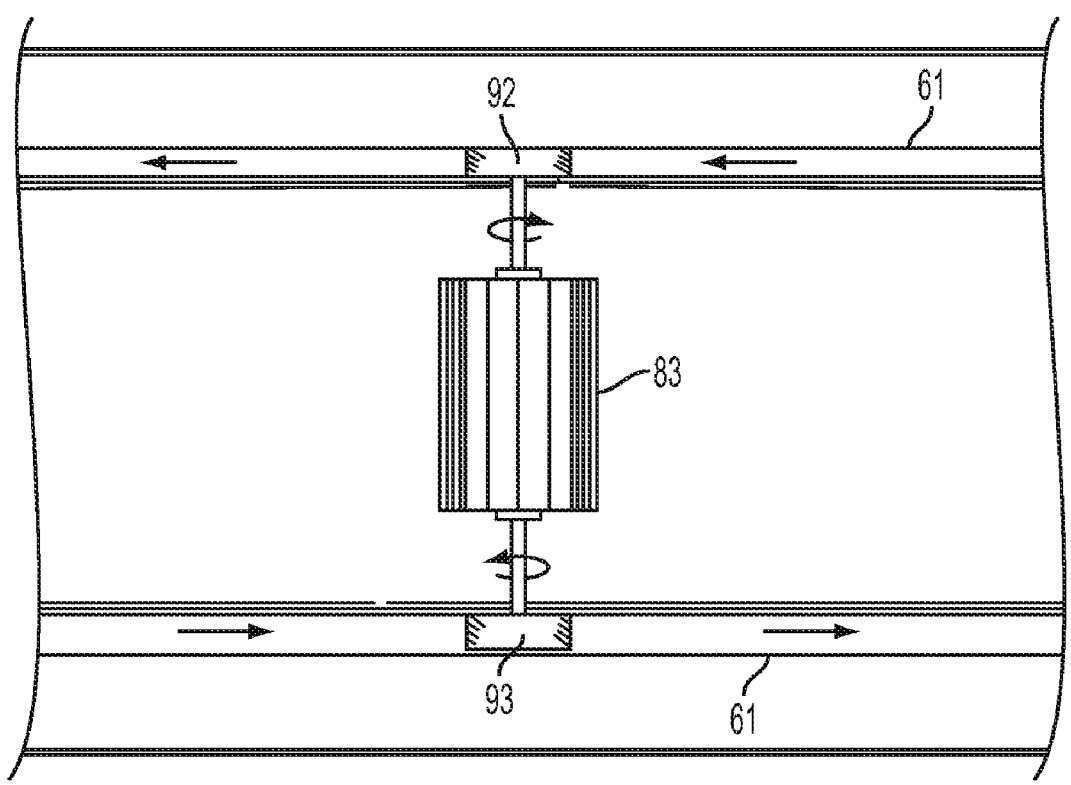
FIG. 13 is a configuration of incorporating a Dynamoelectric generator with plural rotary elements.

FIG. 13 is a generator schematic showing drives from both rungs of the power-take-off device 61 driving wheels 92 and 93 turning an electric dynamoelectric generator 83, with a plural rotary, where the field and armature rotate counter to each other by an interconnecting drive mechanism.

Figure 14A:
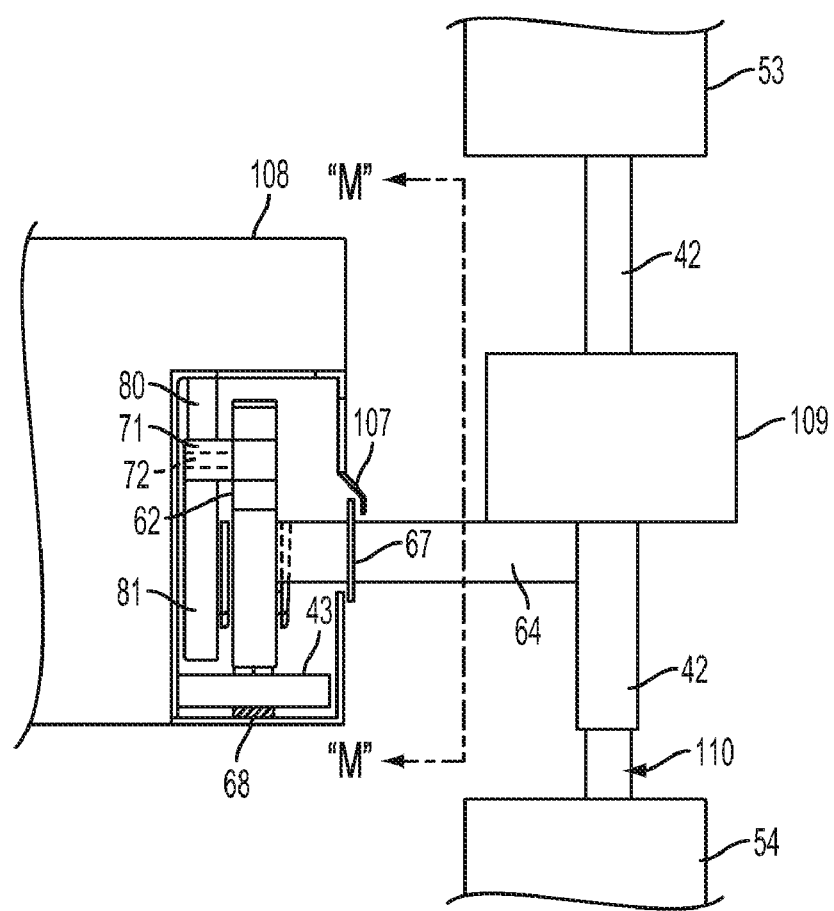
FIGS. 14(a) and (b) are side sectional, and front views respectively of a car assembly generator system and a monorail enclosure.
Figure 14B:
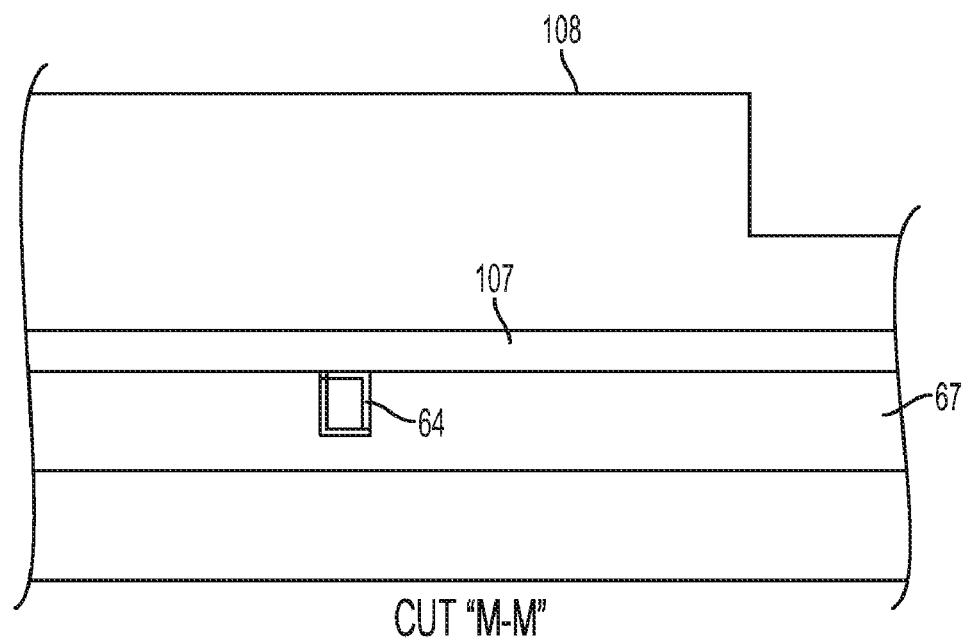

FIGS. 14(a) and (b) show a side sectional view of an enclosed flange 107 and plate 67 are assembled to keep foreign objects from entering. FIG. 14(b) shows a front view of the enclosure, with only the linkage portion 64 protruding out.

FIGS. 15(a) and (b) Depicts more particularly how a monorail cover plate arrangement works. FIG. 15(a) shows a top sectional view of a cover plate 67 as the main part for covering the interior of the monorail. The cover plate 67 is attached to a linkage portion 64 and a brace FIG. 16 129 stemming from the power-take-off device 61. As the power-take-off device 61, with the attached cover plate 67 travels around the monorail 49 end turns, the cover plate 67 remains stationary. A spring 130 tensioned cover plate door 131 begins to expand away from stationary cover plate 67 and at an increasing angle. The door 131 mover outward from hinge 125 and roller 127 pushes the door 131 outwardly against the spring 130 tensioned door 131 and thus retains a monorail closure. After negotiating the curve on to the straight-away, the door 131 closes gently against the sealed pad 128.

In FIG. 16 a linkage portion 64, stemming from car assembly 112 is at a 90 degree angle. On the curved section, the linkage portion 64 is at an oblique angle, in relation to outside the monorail.

A best way is to pick the angle between the radiant angle 133 and the right angle 134, and use an intermediate angle between the two 132, FIG. 17, schematic.

FIG. 18 is a sectional view of a car assembly 112 showing tandem carrier wheels 68 as another option.

A brake assembly 135, having brake pads 136 on brake clamps 137. The brakes would work on an air brake system wherein loss of pressure for various mechanical and or electrical reasons, would render a complete stop to the power generation system 200.

Figure 19A:
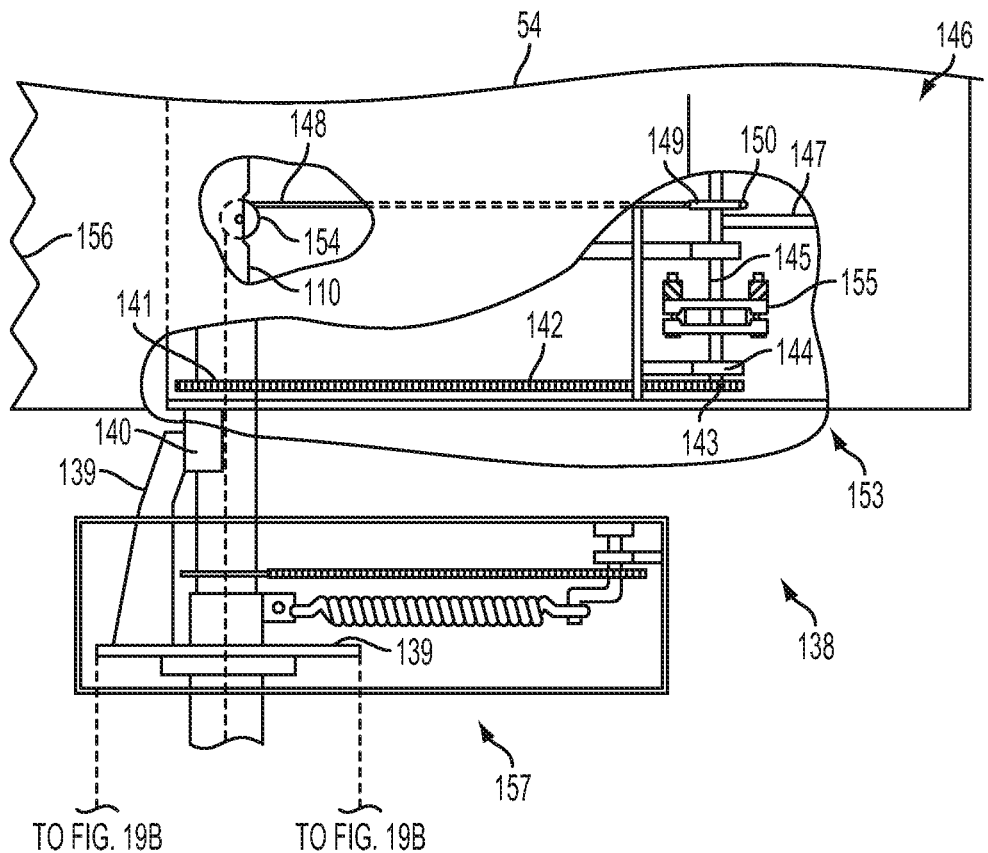
FIGS. 19(a) and (b) are a sectional side and top view, respectively, of an automatic triple airfoil orientation mechanism.
Figure 19B:
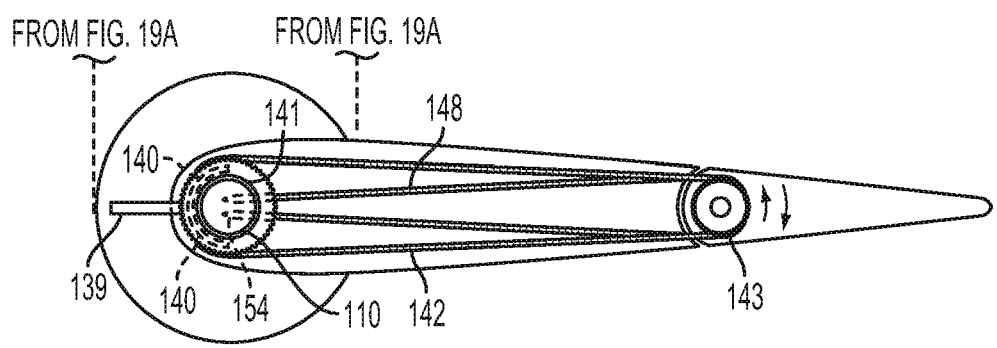
FIGS. 19(c) and (d) are sectional views illustrating various cables configurations of the present invention.

In FIG. 19(a), another embodiment to the invention, is an automatic airfoil flap orientation mechanism 138.

On gear plate 139 a metal stand 139 is rigidly affixed to plate stand 139 with a semicircle tubular member 140 having a solidly affixed stationary gear 141 thereon. A chain 142 circumscribes gear. Shaft 145 is attached to airfoil flap 146 by a support arm 147. A pulley 149 connected to shaft 145 has a cable 148 around pulley 149 and is solidly affixed on the pulley at a point 150, in line with the airfoil furthest from the airfoil shaft 110. Cable 148 continues back through the outer wall of airfoil shaft 110 to guide the cable downwardly through the center hollow shaft 110 to a next airfoil.

Figure 19C:
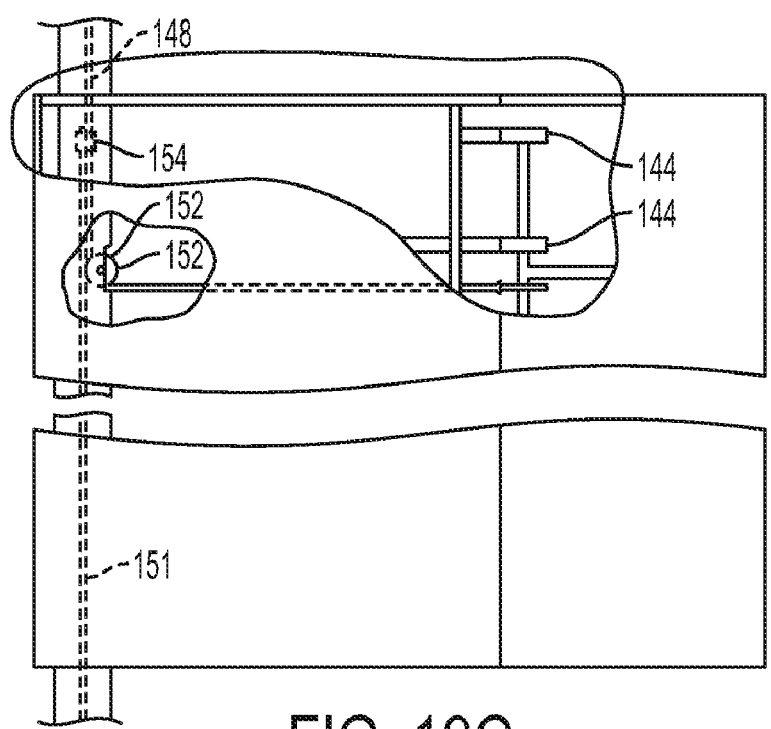
Figure 19D:
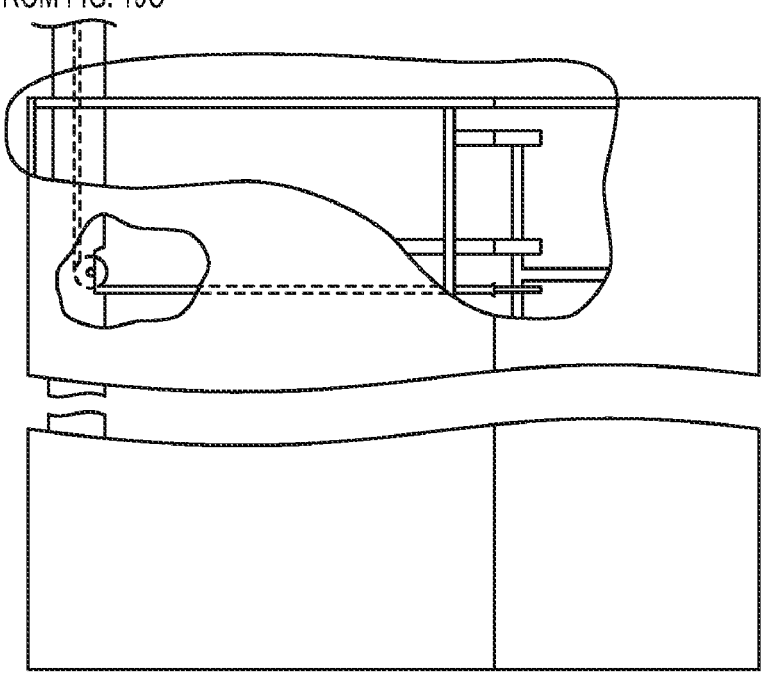

FIG. 19(c) is where the cable 148 is conjoined by a clamp 154 with another extending cable 151. Cable 148 continues on downwardly, going around pulleys 152, diverting to a second flap orientation mechanism 153. Cable 148 continues on downwardly to another pulley diverting cable to a next flap orientation mechanism, FIG. 19(d), which is identical to FIG. 19(c). A slip clutch 155 is identified.

A flap addition to an airfoil has increasingly been noted to produce more lift, thus, more energy produced. Furthermore it was discovered by a professor Frank Fish of Westchester University, PA., that Humpback Whale's fins, when duplicated artificially and tested in a wind tunnel, produced results that were very positive. They found that placing a series of humps 156 along the leading edge of an airfoil, produced an 8% increase in lift, and a 32% decrease in drag. In FIG. 19(a) a leading edge of the airfoil 146 in the present invention, incorporates this design with humps 156.

Figure 20A:
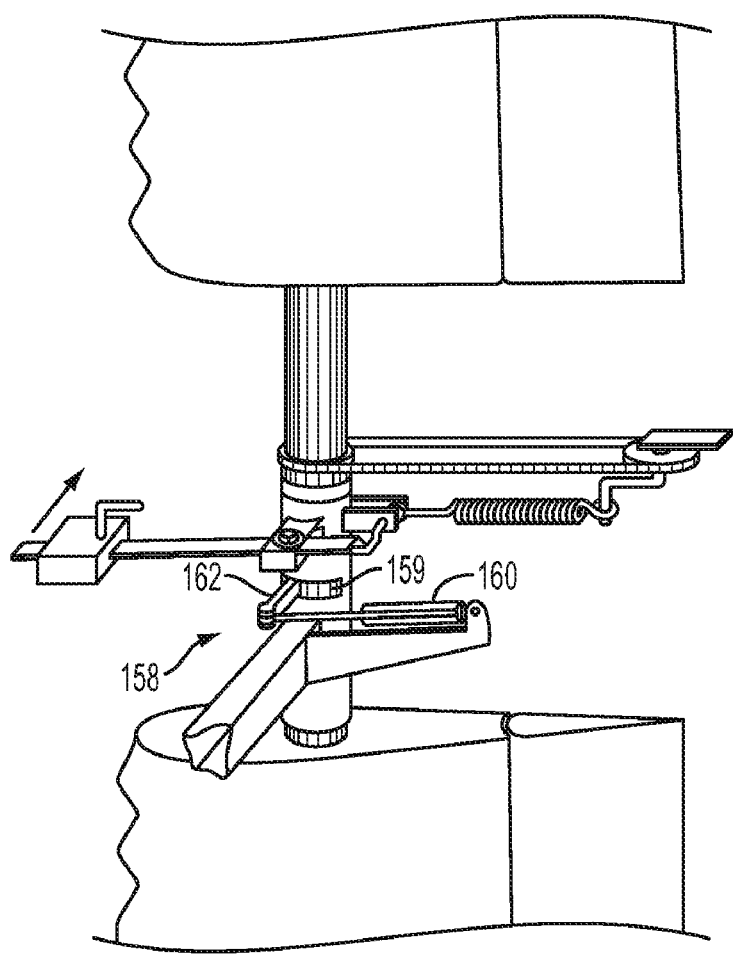
FIG. 20(a)-(c) are a perspective expanded and schematic view, respectively, of a bias mechanism with a pull pin pendulum release and feathering of an airfoil and airfoil orientation mechanism.
Figure 20B:
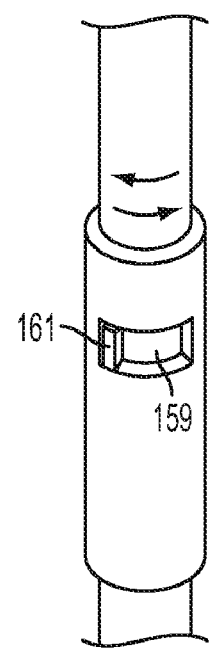
Figure 20C:
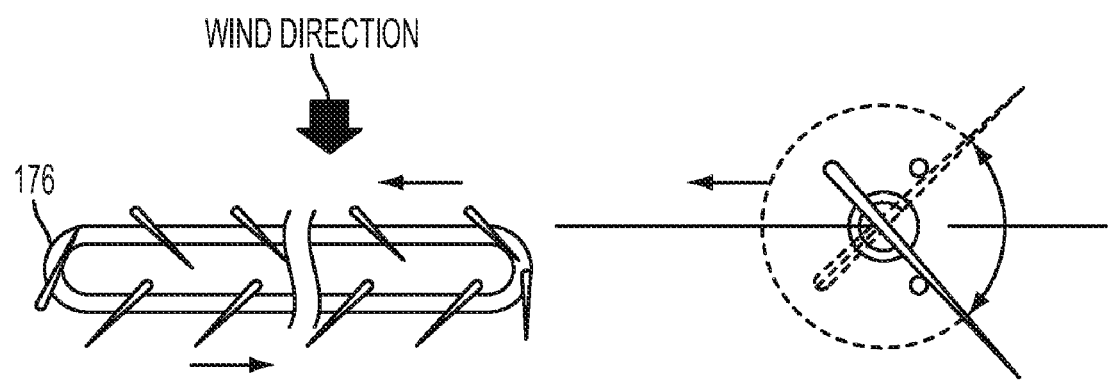

FIG. 20(a) is a perspective of an airfoil assembly 158 passive design. This passive notch positioner 159 acts well for water flows with a submerged energy machine, and is adaptable to wind for its simplicity. This airfoil passive design 158 incorporates two other features. First, a mechanism creating a bias, and second, a hydraulic dampener 160 to alleviate an abrupt stop. To represent the action more clearly, FIG. 20(b) is shown, and a schematic FIG. 20(c) shows the back and forth motion an airfoil would take in relation to the notch positioner stub arm.

Figure 21:
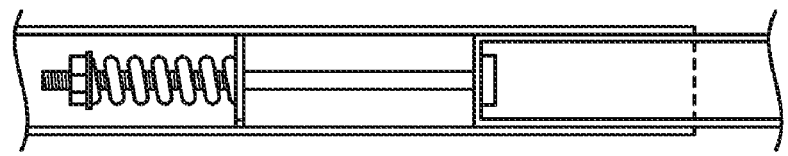
FIG. 21 is a master link for expansion and contraction of the power-take-off devise.

FIG. 21 shows a device to compensate for expansion and contraction of the power-take-off device.

Figure 22A:
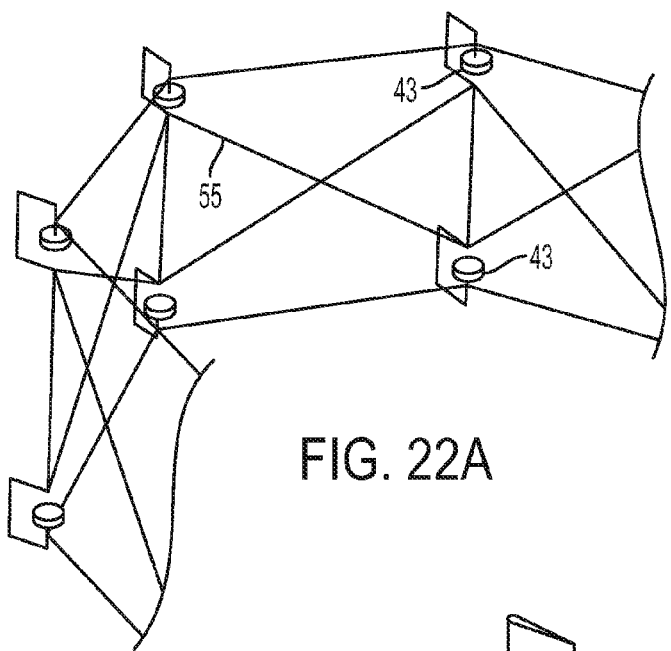
FIGS. 22(a) and (b) are a schematic and perspective views of cable and structural support for an airfoil train.

FIG. 22(a) shows a schematic of an airfoil frame cable brace with ends of each cable perfectly aligned with the guide wheels 43 center's axis.

Figure 22B:
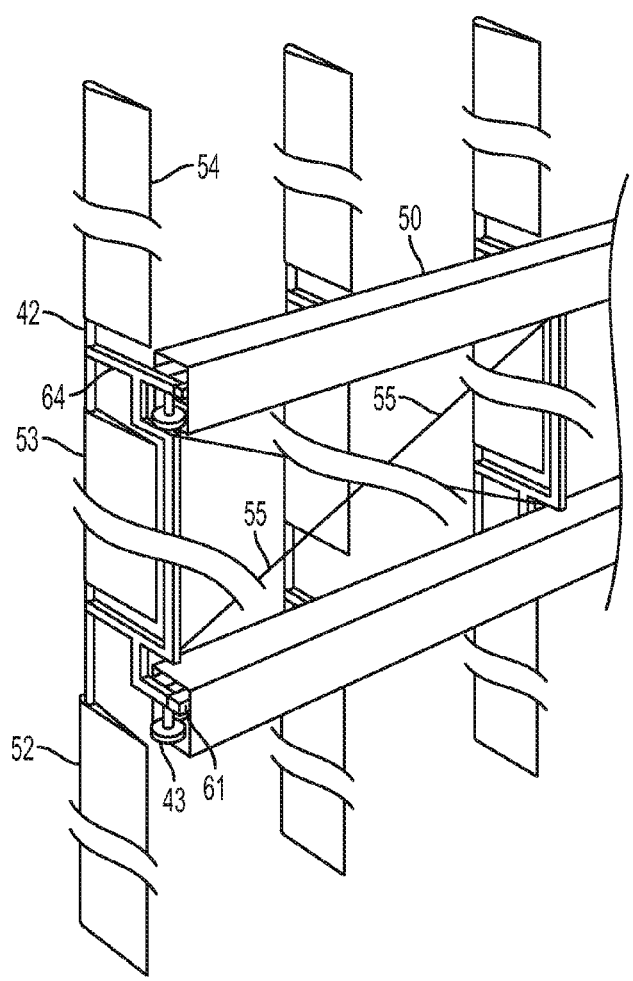

FIG. 22(b) is a rough sketch of airfoils and the cable bracing.

The use of cable bracing in structures gives much strength and economy. FIG. 23(a) is a perspective view from the top showing an option to what a structure is to hold a monorail 49.

Figure 23B:
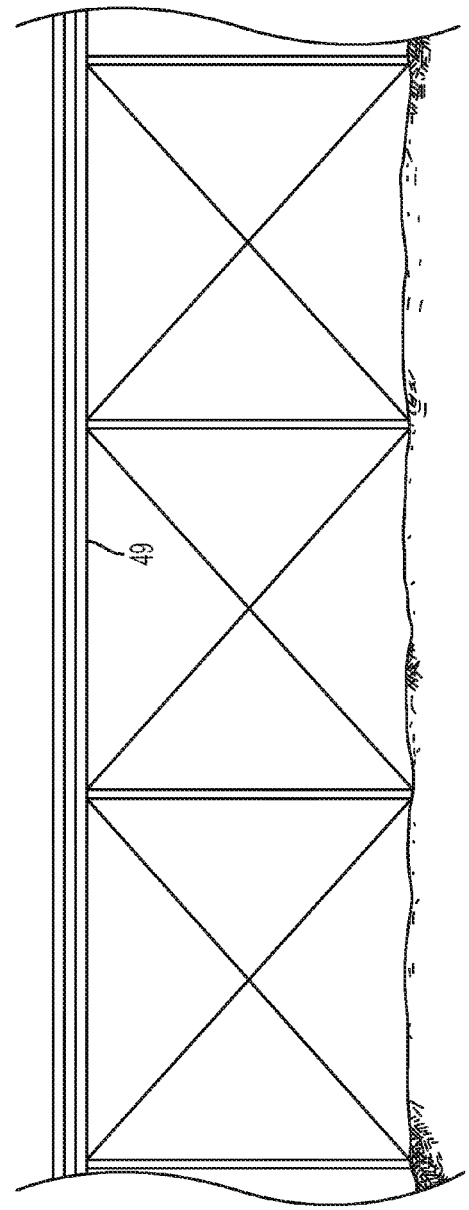

FIG. 23(b) is a front view of same.

Figure 24:
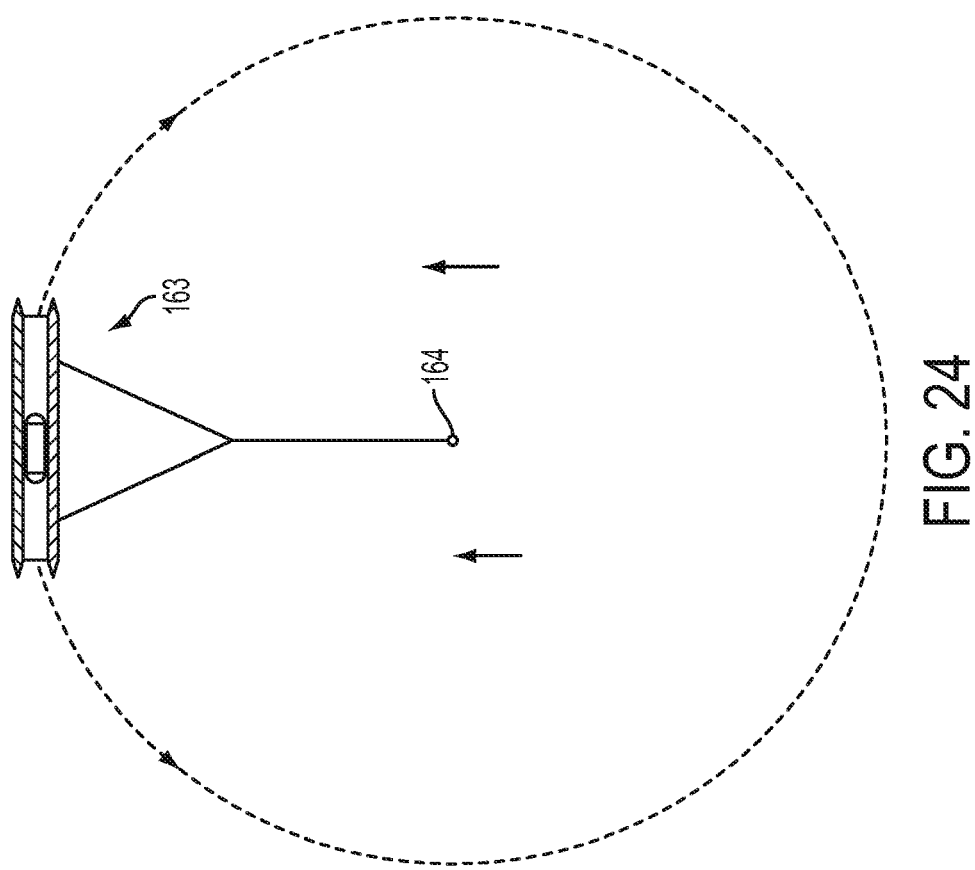
FIG. 24 is a schematic view of an offshore multiple airfoil catamaran and anchor.

FIG. 24 shows an offshore application of the present invention. It represents an aerial view of a monorail power generation system assembly, FIG. 200 constructed unto a catamaran sail ship 163 that is tethered to a permanent anchor 164 at the ocean floor. There are arrows indicating the direction of the wind, therefore, the sail vessel is down wind of the anchor. As the wind changes direction, so also, the sail ship 163 changes course.

Figure 25:
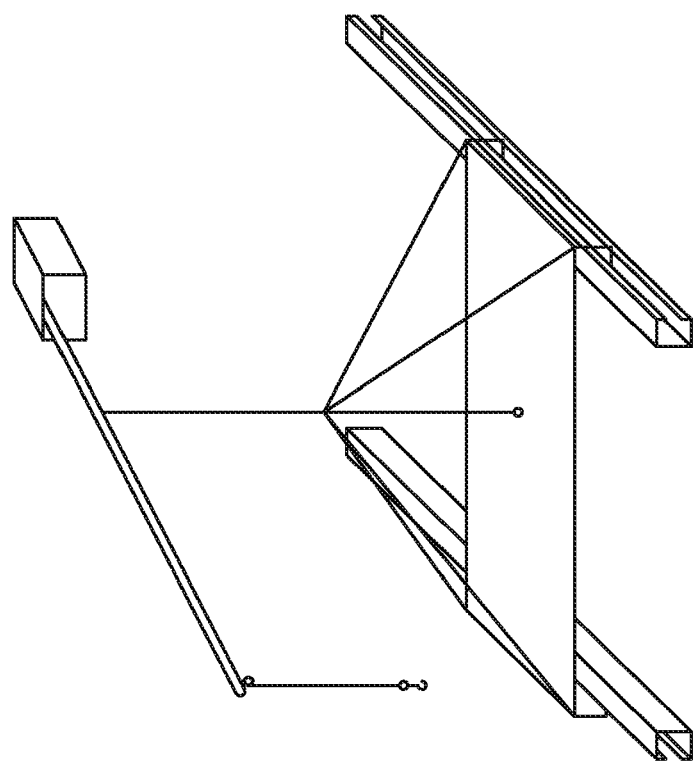
FIG. 25 is a crane mounted to the rails for ease of construction.

FIG. 25 shows a schematic representation of a crane fashioned so as to attach to the rails at the beginning of construction. An initial partial structure, with a customized crane, allows the building of the rest of the structure without the formidable expense of a major crane.

Figure 26:
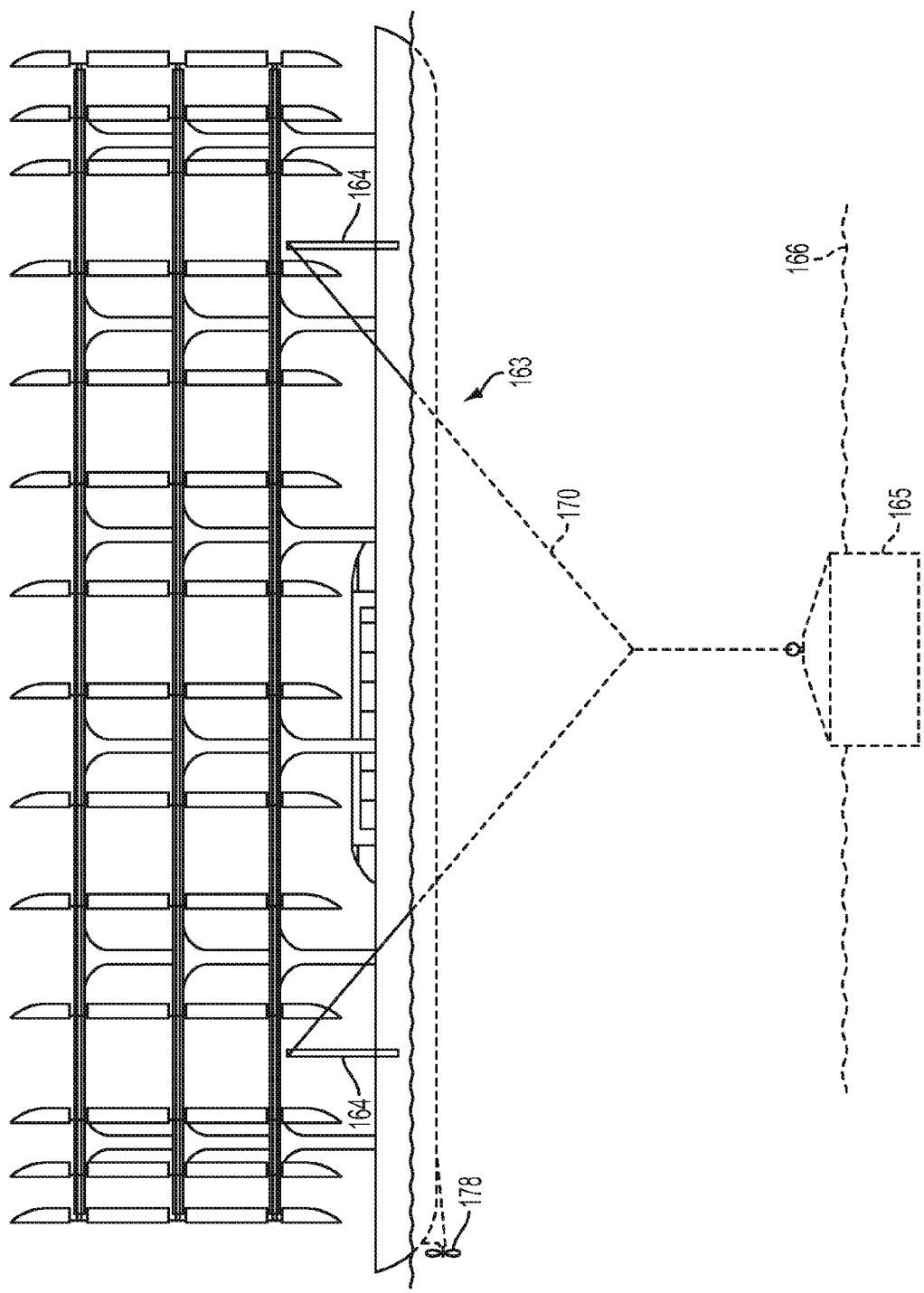
FIG. 26 is a side view of an offshore multiple monorail catamaran, tethered, anchored, and adjustable stabilizer arms.

FIG. 26 shows and enlarged side view of a sail ship 163 with securely attached adjustable stabilizer arms. Cables 164 are attached to the stabilizer arms 164 and an end hooked pivotally to an anchor 165 imbedded into the sea floor 166. There is a catamaran boat 163 having a power generation system 200 of car sails assembly 112 traversing within a monorail producing electrical energy. The electrical energy can be sent to shore to tie in with transmission lines, for boat energy needs and or to propel the boat through the water by propeller 178.

Figure 27A:
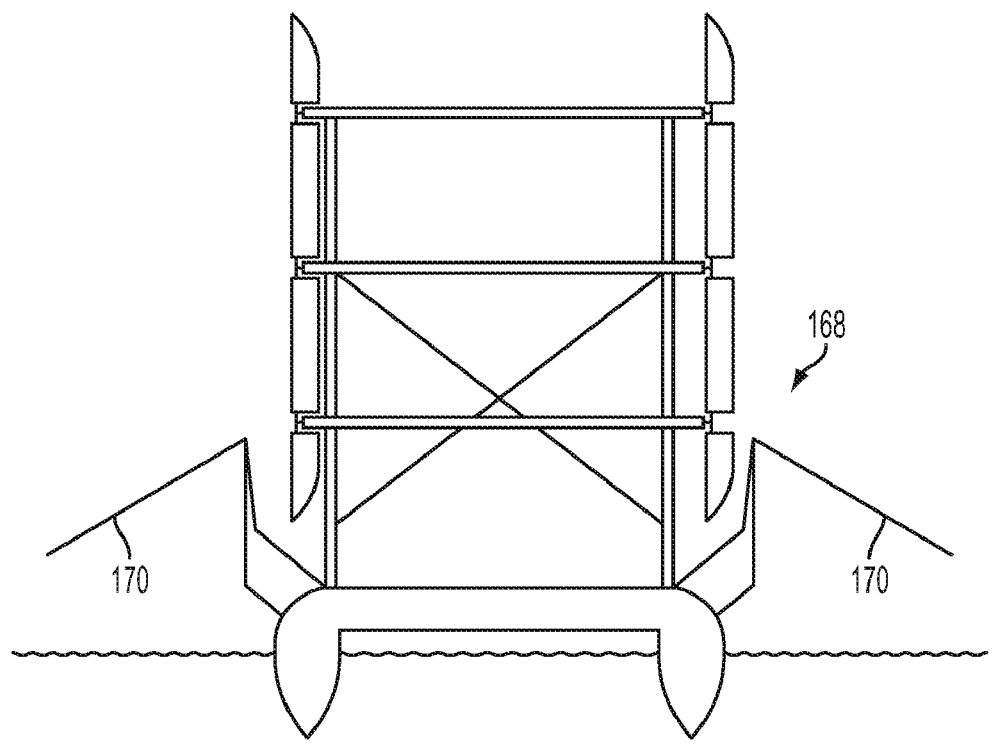
FIGS. 27(a) and (b) is a three stage monorail catamaran with dual stability anchors and anchor lines.
Figure 27B:
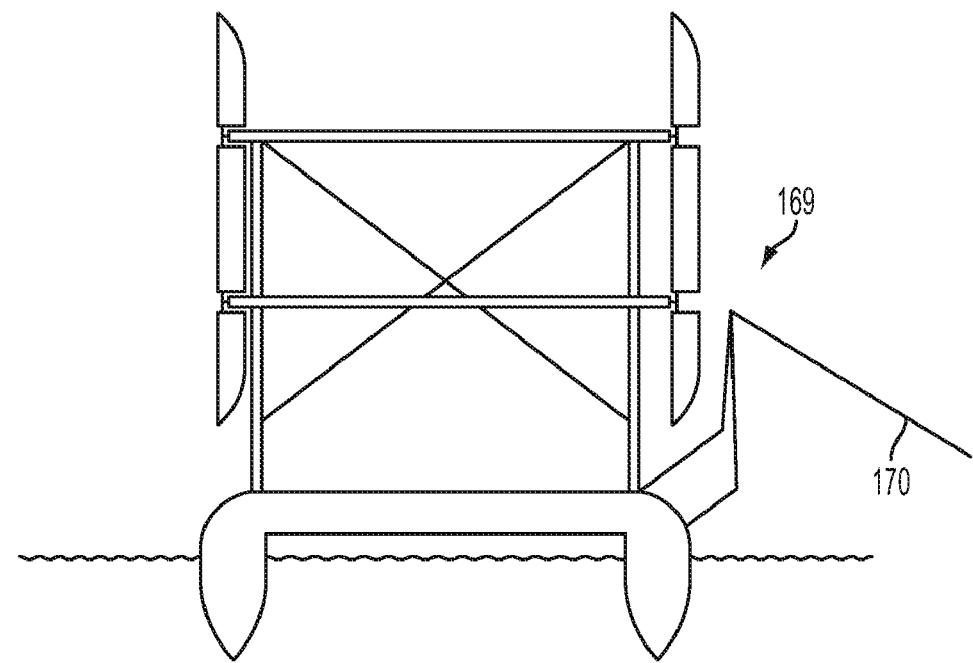

FIGS. 27(a) and (b) are front views of a monorail sail ship 168 and 169 with anchor cables 170.

What is claimed is:
1. A power generation assembly for use in generating electrical power from air or water currents, comprising:
 a) a tiered multiple rail system;
 b) a vane assembly, having a frame and at least one vane configured to interact with said current to produce a force:
 c) a car assembly, slidably mounted to the rail, including a first and second guide wheels and a longitudinal axis element running between the first and second guide wheels and a linkage portion coupled to the frame, the force being usable to move the cars assembly with respect to the rail system;
 d) a power-take-off device operatively coupled to the cars assembly, whereon the power-take-off device is coupled to the longitudinal axis element; and
 e) a generating system having:
 i) a generator, and
 ii) a cable operatively coupled to the generator and engaged to a cable clamp grip conjoined to a power-take-off device, the generator being driven when the power-take-off device moves with respect to the rail system.

2. The power generation assembly of claim 1, wherein the power-take-off device pivotally connects the car assembly to at least one additional car assembly.

3. The power generation assembly of claim 1, wherein the power-take-off device comprises a beam.

4. The power generation assembly of claim 1, wherein the power-take-off device is coupled to the longitudinal axis element.

5. The power generation assembly of claim 1, wherein the power-take-off device comprises a multiplicity of pivotally linked connector elements, each of which has a tongue at a first end and a groove at an opposite end, such that each power-take-off connector element may pivotally engage an adjacent power-take-off connector element in a tongue-and-groove coupling.

6. The power generation assembly of claim 1, wherein the rail system comprises a monorail.

7. The power generation assembly of claim 1, wherein the vane is configured to interact with an air flow.

8. The power generation assembly of claim 1, wherein the vane is configured to interact with a water flow.

9. A power generation assembly configured for generation electrical power from at least one of wind and water currents, including:
   a) a dual rail system comprising a rail in a continuous loop;
   b) vane assembly, having a frame and at least one vane configured to cooperate with said at least one of wind and water currents to produce force acting on the frame;
   c) a dual car assembly including a multiplicity of dual cars pivotably interconnected to form a continuous loop, said cars assembly including a first and second guide wheels and a longitudinal axis element running upwards from said guide wheels said cars assembly being movably carried by the dual rail system and said cars assembly being connected to said frame of the vane assembly whereby said force can be transferred to the cars assembly and move it along the continuous loops;
   d) a power-take-off element operably connected with the car assembly, and being positioned adjacent to the linkage portion within the rail system, the power-take-off element comprising a continuous loop which interacts with a least two cable clamps and cable to transfer moving force from the car assembly through the power-take-off element and the clamped cable to the generator, configured to generate electrical energy, said cable being grippingly engaged with said power takeoff element so that as the power takeoff element translates past the cable drive and the cable travels about allowing transfer of energy from the car assembly to the generator, the assembly converting a portion of the energy of said currents into electrical energy.

10. The power generation assembly of claim 9, further comprising another cable engaged with the power takeoff element opposite side the loop and first cable.

11. The power generation assembly of claim 10, wherein both of said cables can function as drives.

12. The power generation assembly of claim 10, wherein both cable drives are wrapped about one common central generator.

13. The power generation assembly of claim 9, wherein a car includes a least one carrier wheel and one guide wheel.

14. The power generation assembly of claim 13, wherein a car includes at least two guide wheels.

15. The power generation assembly of claim 13, wherein said rail is configured so that the carrier wheel and the guide wheels can travel inside the rail.

16. The power generation assembly of claim 15, wherein the carrier wheel can pivot with respect to the car.

17. The power generation assembly of claim 9, wherein the vane assembly can be removed from the car assembly.

18. The power generation assembly of claim 9, further comprising a feathering device enabling feathering of the vane.

19. A power generating assembly of claim 9, wherein cable clamp is coupled to a power takeoff device.

20. A power generating assembly of claim 9, wherein said clamp is acted upon by a compression chute.

21. A power generating assembly of claim 9, wherein a pair of electric generators, having drive wheels with affixed rotary shafts, hinged at their rearward base, one above another, in a reflective configuration, engages and disengages said drive wheels sandwiches a traversing power takeoff element.

22. A power generating assembly of claim 9, comprising a Dynamoelectric generator with a plural rotary wherein there are drive wheels on opposite sides of the power takeoff loop, one driving the field and the other driving the armature.

23. A power generation assembly of claim 1, wherein a cover plate, door, and flanges provide closure to a monorail, thereby enabling said monorail closure around oval loop and turns and straight sections.

24. A power generation assembly of claim 1, wherein a fail-safe air brake is positioned so as to operate upon the power takeoff device.

25. A power generation assembly of claim 1, wherein a biased airfoil flap is automatically oriented from force of wind into a greater flap angle, providing greater lift comprising a stationary chain sprocket attached said bias element, having said chain connected to said flap sprocket affixed a longitudinal axis shaft secured to the flap frame through bearings and a sprocket affixed at other end of said shaft;
   a cable solidly affixed said sprocket so as to limit 180 degree movement wherein said cable transfer from a said first airfoil flap to a second lower conjoined air foil flap through a tubular member
   said lower airfoil flap duplicates action of said first flap orientation mechanism and multiple duplication thereon a descending conjoined air foils;
   said first airfoil flap incorporates a slip clutch for over rides from extreme gusts of wind force.

26. The power generation assembly of claim 1, wherein are elements to propel an airfoil car assembly about an oval monorail track;
   a) an airfoil, a car, an oval monorail track,
   b) a slotted horizontal sleeve,
   c) an airfoil mast rotary means with in said slotted sleeve with an attached arm protruding outwardly through said slot,
   d) said slot cut out to accommodate a 45 degree angle oscillating movement of said airfoil;
   said elements together propel a said airfoil car around said oval track;
   a hydraulic ram dampener affixed said extended said arm cushions oscillating said arm movements from one side said slot opening to the other.

27. The power generation assembly of claim 1, wherein is a muti-tiered monorail airfoil car assembly constructed on a catamaran boat with rigidly affixed upright stabilizer arms with cables adjustably attached thereon to said upright stabilizer arms;

said cable tethered to permanently stable anchors and a pivotal means for orientation to wind currents wherein said boat sails through water by airfoil orientation and is transportable;
said power translates to propeller power and boat energy needs;
said stabilizers attach both sides of said catamaran boat with said tether cable lines to permanent anchors.

28. The power generation assembly of claim 1, wherein a crane is slidably attached to partially constructed power generation system.

29. The power generation assembly of claim 1, wherein is a power takeoff element comprising a curved conjoining tongue and groove joint.

* * * * *